United States Patent
Itoh et al.

(10) Patent No.: US 8,331,622 B2
(45) Date of Patent: Dec. 11, 2012

(54) AUTOMOTIVE DISPLAY DEVICE, VEHICLE, AND DISPLAY METHOD WITH 3-D PERSPECTIVE IMAGE

(75) Inventors: Megumi Itoh, Nara (JP); Toshiya Takahashi, Soraku-gun (JP); Shinichirou Ota, Nara (JP); Aki Miake, Nara (JP); Takeshi Yamamoto, Soraku-gun (JP); Masayuki Kikuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1237 days.

(21) Appl. No.: 11/570,089

(22) PCT Filed: Jun. 6, 2005

(86) PCT No.: PCT/JP2005/010732
§ 371 (c)(1),
(2), (4) Date: Dec. 6, 2006

(87) PCT Pub. No.: WO2005/120902
PCT Pub. Date: Dec. 22, 2005

(65) Prior Publication Data
US 2008/0258897 A1 Oct. 23, 2008

(30) Foreign Application Priority Data
Jun. 7, 2004 (JP) .................................. 2004-169164

(51) Int. Cl.
*G06K 9/00* (2006.01)
(52) U.S. Cl. ........ 382/104; 382/277; 340/461; 340/905; 701/436
(58) Field of Classification Search .................. 382/104, 382/277; 340/461, 905; 701/436
See application file for complete search history.

(56) References Cited

U.S. PATENT DOCUMENTS

| | | | | |
|---|---|---|---|---|
| 5,612,881 A | * | 3/1997 | Moroto et al. | 701/209 |
| 5,764,139 A | | 6/1998 | Nojima et al. | |
| 6,141,012 A | * | 10/2000 | Bollman et al. | 345/418 |
| 6,243,645 B1 | | 6/2001 | Moteki et al. | |

(Continued)

FOREIGN PATENT DOCUMENTS

JP 62-115623 U 7/1987

(Continued)

OTHER PUBLICATIONS

Official Communication for PCT Application No. PCT/JP2005/010732 mailed on Sep. 27, 2005.

*Primary Examiner* — Chan S Park
*Assistant Examiner* — Eueng-Nan Yeh
(74) *Attorney, Agent, or Firm* — Keating & Bennett, LLP

(57) ABSTRACT

An automotive display device, which allows the user to easily recognize the sameness of an information image even if the shape of the image is changed, is realized. An automotive display device (1) includes a display section (13) for displaying a vehicle information image including information regarding a vehicle. The vehicle information image is a 3-D image. The automotive display device (1) further includes an image processing section (113) for generating a vehicle information image seen from a fixed viewpoint, an image display processing section (114) for displaying the vehicle information image on the display section (13), and an ETC information detection section (21) that detects a driving condition of the vehicle. The image processing section (113) rotates the vehicle information image around a predetermined axis and for a predetermined angle, in accordance with ETC information obtained by the ETC information detecting section (21).

2 Claims, 19 Drawing Sheets

U.S. PATENT DOCUMENTS 6,947,064 B1 * 9/2005 Hahn et al. .................... 701/301

FOREIGN PATENT DOCUMENTS

| | | |
|---|---|---|
| JP | 09-123848 | 5/1997 |
| JP | 2000-075999 | 3/2000 |
| JP | 2001-133272 | 5/2001 |
| JP | 2004-182092 | 7/2004 |
| WO | 98/20303 | 5/1998 |
| WO | WO 01/15928 * | 3/2001 |

* cited by examiner

BASIC STATE

ROTATION AXIS: Y AXIS
ROTATION ANGLE: 45°

FIG. 5

| CAR CONDITION | IMAGE COMPONENT | ROTATIONAL STATE | ARRANGEMENT COORDINATES |
|---|---|---|---|
| "ORDINARY ROAD" OR DEVICE HAS BEEN ACTIVATED | SPEED/TACHO-METER | BASIC STATE | ARRANGEMENT COORDINATES a0 |
| | NUMERIC SPEED DISPLAY IMAGE | BASIC STATE | ARRANGEMENT COORDINATES b |
| "TOLL HIGHWAY" | SPEED/TACHO-METER | ROTATION AXIS: Y AXIS ROTATION ANGLE: 45° | ARRANGEMENT COORDINATES a1 |
| | NUMERIC SPEED DISPLAY IMAGE | BASIC STATE | ARRANGEMENT COORDINATES b |
| ⋮ | ⋮ | ⋮ | ⋮ |

FIG. 9

| CAR CONDITION | IMAGE COMPONENT | ROTATIONAL STATE | ARRANGEMENT COORDINATES |
|---|---|---|---|
| "ORDINARY ROAD" OR DEVICE HAS BEEN ACTIVATED | SPEED METER | BASIC STATE | ARRANGEMENT COORDINATES d0 |
| | TACHOMETER | BASIC STATE | ARRANGEMENT COORDINATES c0 |
| "TOLL HIGHWAY" | SPEED METER | ROTATION AXIS: Y AXIS ROTATION ANGLE: 45° | ARRANGEMENT COORDINATES d1 |
| | TACHOMETER | ROTATION AXIS: Y AXIS ROTATION ANGLE: 45° | ARRANGEMENT COORDINATES c1 |
| | REST AREA MILEAGE DISPLAY IMAGE | BASIC STATE | ARRANGEMENT COORDINATES e |
| ⋮ | ⋮ | ⋮ | ⋮ |

BASIC STATE

ROTATION AXIS: Y AXIS
ROTATION ANGLE: 45°

FIG. 14

| CAR CONDITION | IMAGE COMPONENT | ROTATIONAL STATE | ARRANGEMENT COORDINATES |
|---|---|---|---|
| DEVICE HAS BEEN ACTIVATED | SPEED METER | ROTATION AXIS: Z AXIS ROTATION ANGLE: -45° | ARRANGEMENT COORDINATES d2 |
| | TACHOMETER | ROTATION AXIS: Z AXIS ROTATION ANGLE: 45° | ARRANGEMENT COORDINATES c2 |
| | IN-VEHICLE TEMPERATURE DISPLAY IMAGE | BASIC STATE | ARRANGEMENT COORDINATES f |
| AFTER START OF VEHICLE | SPEED METER | BASIC STATE | ARRANGEMENT COORDINATES d0 |
| | TACHOMETER | BASIC STATE | ARRANGEMENT COORDINATES c0 |
| ⋮ | ⋮ | ⋮ | ⋮ |

BASIC STATE

ROTATION AXIS: Z AXIS
ROTATION ANGLE: 45°

ROTATION AXIS: Z AXIS
ROTATION ANGLE: 45°

BASIC STATE

ROTATION AXIS: Y AXIS
ROTATION ANGLE: 45°

FIG. 22

| CAR CONDITION | IMAGE COMPONENT | ROTATIONAL STATE | ARRANGEMENT COORDINATES |
|---|---|---|---|
| "ORDINARY ROAD" OR DEVICE HAS BEEN ACTIVATED | SYNTHESIZED IMAGE OF SPEED/TACHO-METER AND CAMERA ACTIVATION DISPLAY IMAGE | BASIC STATE | ARRANGEMENT COORDINATES a0 |
| "TOLL HIGHWAY" | SYNTHESIZED IMAGE OF SPEED/TACHO-METER AND CAMERA ACTIVATION DISPLAY IMAGE | ROTATION AXIS: Y AXIS ROTATION ANGLE: 45° | ARRANGEMENT COORDINATES a1 |
| | TRAVELING ROUTE DISPLAY IMAGE | BASIC STATE | ARRANGEMENT COORDINATES e |
| ⋮ | ⋮ | ⋮ | ⋮ |

FIG. 23

| IMAGE COMPONENTS TO BE SYNTHESIZED | BARYCENTRIC POSITION |
|---|---|
| SPEED/TACHO-METER | ORIGIN |
| CAMERA SYSTEM ACTIVATION IMAGE | XYZ COORDINATES $(0, y_3, 0)$ |

AUTOMOTIVE DISPLAY DEVICE, VEHICLE, AND DISPLAY METHOD WITH 3-D PERSPECTIVE IMAGE

BACKGROUND OF THE INVENTION

1. Field of the Invention

The present invention relates to an automotive display device for displaying vehicle information images indicating vehicle speed, engine revolutions, and the like, a vehicle equipped with the automotive display device, and a display method in regard to the automotive display device.

2. Description of the Related Art

As an instrument panel of a car, an automotive display device has been proposed. In accordance with a driving condition, the automotive display device changes, for example, the display sizes of vehicle condition information such as vehicle speed and engine revolutions and the display sizes of additional images such as a navigation image.

Publicly-Known Document 1 (Japanese Laid-Open Patent Application No. 9-123848; published on May 13, 1997, corresponding to U.S. Pat. No. 5,764,139), for example, teaches that the type of information and the size of an area for displaying the same are suitably changed in accordance with the change in a driving condition, so that various types of information required for the driving are displayed in line with the order of importance, allowing the driver and other passengers to surely obtain the information.

Meanwhile, Publicly-Known Document 2 (Japanese Laid-Open Patent Application No. 2001-133272; published on May 18, 2001) teaches that the number of map images or the ratio between plural images, which are displayed on the image display device, is set in line with a driving condition.

In Publicly-Known Document 1, however, the display information and the display size are appropriately changed in accordance with the change in the driving condition, so that a speed meter or the like is downsized or upsized in accordance with the driving condition. For instance, when a driving condition changes to another driving condition, the size of the speed meter is reduced to 40%. In this case, the user may recognize that the speed meter before the reduction and the speed meter after the reduction are different images. In other words, the user cannot immediately recognize that the image after the reduction and the image before the reduction both show the speed meter. It is assumed that this often occurs while driving, because the user typically glances down the instrument panel for only a short period of time.

SUMMARY OF INVENTION

The present invention was done in consideration of the above-identified problem. The objective of the present invention is to provide an automotive display device which allows the user to easily recognize the sameness of an information image even if the shape of the image is changed, and also to provide a vehicle and a display method.

To solve the problem above, the automotive display device of the present invention, which is provided in a vehicle and includes a display section for displaying a vehicle information image including information in regard to the vehicle, is characterized by comprising: a first vehicle information image based on which the vehicle information image is generated; and at least one second vehicle information image generated by rotating the first vehicle information image in three dimensions.

In addition to the above, the automotive display device of the present invention is characterized in that a width of said at least one second vehicle information image is shorter than a width of the first vehicle information image.

In addition to the above, the automotive display device of the present invention is characterized in that a length of said at least one second vehicle information image is shorter than a length of the first vehicle information image.

In addition to the above, the automotive display device of the present invention is characterized in that a display area of said at least one second vehicle information image is smaller than a display area of the first vehicle information image.

In addition to the above, the automotive display device of the present invention is characterized in that the first vehicle information image is switched to said at least one second vehicle information image and vice versa, in accordance with a driving condition of the vehicle.

It is noted that, "to rotate in three dimensions" indicates a rotation with respect to an axis which is not in parallel to the display screen of the automotive display device.

According to the arrangements above, when necessary, the automotive display device displays, on the display section, a second vehicle information image generated by rotating a basic first vehicle information image in three dimensions. On this account, the automotive display device can display, on the display section, a vehicle information image with different shapes according to need. Therefore, in accordance with the shape of the vehicle information image displayed on the display section, it is possible to change a display area of another image and add another image.

To solve the problem above, the automotive display device of the present invention is provided in a vehicle and includes a display section for displaying a vehicle information image including information in regard to the vehicle, the display vehicle information image being generated based on at least one first vehicle information image, the automotive display device being characterized by comprising: an image generating section that generates a second vehicle information image by, when necessary, rotating said at least one first vehicle information image in three dimensions; and an image display processing section that displays the vehicle information image on the display section.

Also, to solve the problem above, the display method of the present invention in an automotive display device which is provided in a vehicle and includes a display section for displaying a vehicle information image including information in regard to the vehicle, the display vehicle information image being generated based on a first vehicle information image, is characterized by comprising the steps of: generating a second vehicle information image by, when necessary, rotating the first vehicle information image for a predetermined angle around a predetermined rotation axis; and displaying the second vehicle information image on the display section.

The first and second vehicle information images are 2-D images in perspective, i.e., assuming that a particular viewpoint is given, in the images nearby objects are large while distant objects are small.

According to the above-described arrangement and method, when necessary, the automotive display device displays, on the display section, a second vehicle information image generated by rotating a basic first vehicle information image in three dimensions. On this account, the automotive display device can display, on the display section, a vehicle information image with different shapes according to need. Therefore, in accordance with the shape of the vehicle information image displayed on the display section, it is possible to change a display area of another image and add another image.

On the occasion above, the user can promptly recognize that the first vehicle information image before the rotation and the second vehicle information image after the rotation are identical in terms of content, because a single vehicle information image is rotated (i.e. simply a viewpoint is moved).

Furthermore, when a part of the vehicle information image is not displayed on the display section, such a part can be displayed on the display section by rotating the vehicle information image and changing the shape thereof. For instance, the vehicle information image is a speed meter, and while a speed region (e.g. a region for not less than 100 km/h) for speeds unusual on an ordinary road is not displayed on the display section when the vehicle travels on an ordinary road, the speed meter is rotated and all speed regions are displayed on the display section when the vehicle travels on a highway.

In addition to the above, the automotive display device of the present invention is characterized by further comprising a vehicle driving condition detection section that detects a driving condition of the vehicle, the image generating section rotating said at least one first vehicle information image, in accordance with the driving condition detected by the vehicle driving condition detection section.

According to this arrangement, the image generating section can automatically rotate the vehicle information image, in accordance with the driving condition. On this account, the image generating section can automatically change the shape of the vehicle information image, in accordance with the driving condition.

For instance, assume that the vehicle information image is a speed meter and the vehicle driving condition detection section detects a type of road on which the vehicle travels (i.e. whether an ordinary road or a highway). In this case, when the vehicle driving condition detection section detects an ordinary road, the image generating section rotates the speed meter in such a manner as to enlarge a low-speed region of the speed meter to be larger than a high-speed region of the speed meter. Alternatively, the image generating section rotates the speed meter in such a manner as to exclude the high-speed region from the display section. With this, it is possible to reduce an area for the high-speed region that is unnecessary while driving on an ordinary road. On the other hand, when the vehicle driving condition detection section detects a highway, the image generating section rotates the speed meter so as to equally display all speed regions of the speed meter. With this, the user can see all speed regions that may be required while driving on a highway.

In addition to the above, the automotive display device of the present invention is characterized in that the image display processing section causes the display section to display a driving condition related image that relates to the driving condition, in accordance with the driving condition detected by the vehicle driving condition detection section.

According to this arrangement, on the display section, the user can see the driving condition related image relating to the driving condition of the vehicle. As described above, the shape of the vehicle information image displayed on the display section is changed in accordance with the driving condition. Therefore, the image display processing section can display the driving condition related image at a suitable region on the display section, in accordance with the change in the shape of the vehicle information image. As a result, the user can surely see both the driving condition related image and the vehicle information image.

In addition to the above, the automotive display device of the present invention is characterized in that when said at least one first vehicle information image is rotated, the image generating section generates a second vehicle information image that is a moving image indicating in what manner said at least one first vehicle information image is rotated.

According to this arrangement, the user can see how the vehicle information image is rotated in accordance with the driving condition. On this account, the user can surely recognize that a single vehicle information image is continuously displayed on the display section.

In addition to the above, the automotive display device of the present invention is characterized by further comprising a vehicle information image synthesizing section that synthesizes predetermined two or more of said at least one first vehicle information image, the image generating section generating a synthesized vehicle information image as a result of synthesis performed by the vehicle information image synthesizing section.

According to this arrangement, the image generating section generates the synthesized vehicle information image synthesized by the vehicle information image synthesizing section. In this arrangement, as compared to an arrangement in which a second vehicle information image is generated for each of vehicle information images to be synthesized, the number of times the second vehicle information images are generated is reduced. This simplifies the process in the image generating section.

To solve the problem above, the vehicle of the present invention is characterized by comprising any one of the above-described automotive display devices.

According to this arrangement, the user can easily recognize the sameness of a vehicle information image even if the shape of the image is changed.

The automotive display device of the present invention comprises: a first vehicle information image based on which a vehicle information image is generated; and at least one second vehicle information image generated by rotating the first vehicle information image in three dimensions.

With this arrangement, the automotive display device can display, on the display section, a vehicle information image in different shapes, in accordance with the driving condition. Therefore, in accordance with the shape of the vehicle information image on the display section, it is possible to change a display area of another image and add another image. Furthermore, the user can promptly recognize that the vehicle information image before the rotation and the vehicle information image after the rotation are identical in terms of content, because a single vehicle information image is simply rotated.

Additional objects, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 5 shows an example of the contents of an image component display information storage section of Example 1.

FIG. 9 illustrates an example of the contests of an image component display information storage section of Example 2.

FIG. 13(a) shows a first vehicle information image having not been rotated, while FIG. 13(b) shows a second vehicle information image having been rotated.

FIG. 14 shows an example of the contents of an image component display information storage section of Example 3.

FIG. 18(a) is a first vehicle information image having not been rotated, FIG. 18(b) shows a second vehicle information image having been rotated an angle of 45° counterclockwise around a Z axis, and FIG. 18(c) shows a second vehicle information image having been rotated an angle of 45° clockwise around the Z axis.

FIG. 21(a) shows a first vehicle information image having not been rotated, while FIG. 21(b) shows a second vehicle information image having been rotated.

FIG. 22 illustrates an example of the contents of an image component display information storage section of FIG. 19.

FIG. 23 illustrates an example of the contents of a component synthesizing information storage section of FIG. 19.

DETAILED DESCRIPTION OF PREFERRED EMBODIMENTS

Embodiment 1

One embodiment of the present invention is described below with reference to FIGS. 1-18. In the present embodiment, an automotive display device of the present invention is used as a display for an instrument panel of a car.

Figure 1:
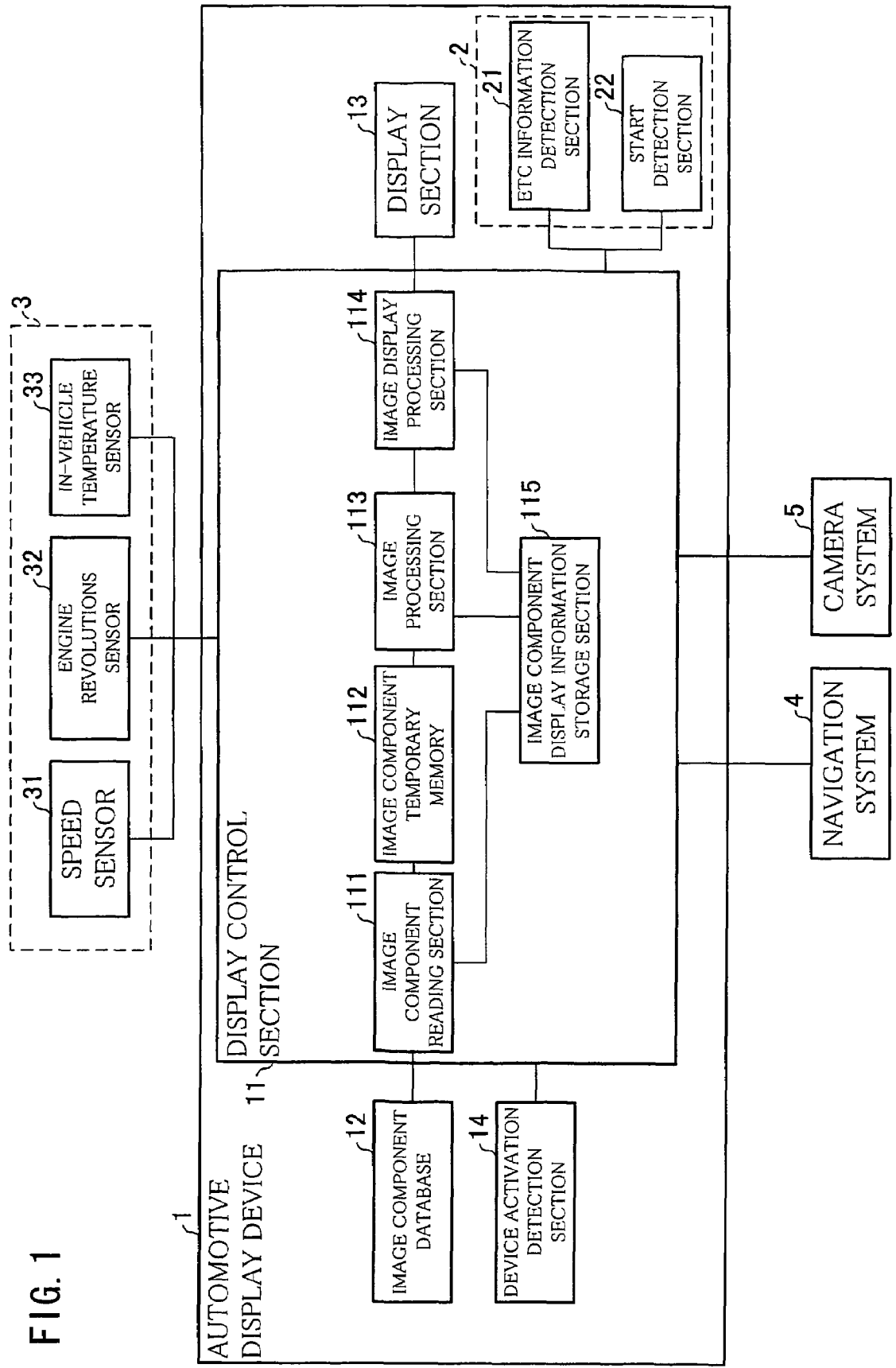
FIG. 1 is a schematic block diagram relating to an embodiment of the present invention, illustrating a vehicle display system including an automotive display device.

As shown in FIG. 1, an automotive display system of the present embodiment includes: an automotive display device 1 for displaying predetermined information; display information sensor system 3 for outputting display information displayed by the automotive display device 1; a navigation system 4 for detecting a position of the car, and a camera system 5 for taking pictures around the car.

The display information sensor system 3 includes members such as a speed sensor 31 for detecting the speed of the car, an engine revolutions sensor 32 for detecting the revolutions of the engine, an in-vehicle temperature sensor 33 for detecting a temperature in the car, a fuel amount sensor (not illustrated) for detecting a remaining amount of fuel, a temperature sensor (not illustrated) for detecting a temperature of water for cooling the engine, and a shift position sensor (not illustrated) for detecting the shift position.

The navigation system 4 is a typical system that detects a position of the car and outputs the distance to a destination or a next rest area, a traveling route, and the like. The navigation system 4 outputs, to the automotive display device 1, information regarding a current position of the car and information concerning a traveling route.

The camera system 5 includes cameras that can take pictures around the car and are fit on appropriate positions of the outer body of the car (e.g. on the right front corner, the right side, the right rear corner, the left front corner, the left side, and the left rear corner of the car). The camera system 5 outputs, to the automotive display device 1, camera activation information indicating which camera is active, pictures taken by the cameras, and the like.

The automotive display device 1 is mounted on the instrument panel of the car, thereby displaying, for instance, speed, engine revolutions, information with regard to a current position of the car, a navigation image, a camera image, and the like. The automotive display device 1 obtains information with regard to images to be displayed, from the display information sensor system 3, the navigation system 4, and the camera system 5.

As shown in FIG. 1, the automotive display device 1 includes a display control section 11, an image component database 12, a display section 13, a device activation detection section 14, and a car condition sensor system 2 including an ETC information detection section 21 and a start detection section 22.

In accordance with a radio signal for ETC (Electronic Toll Collection) system, which is dispatched from a tollgate of a toll highway, the ETC information detection section 21 detects whether or not the car gets on a toll highway from an ordinary road and whether or not the car get off a toll highway, so as to output the detection result. In line with the detection result, the ETC information detection section 21 outputs, to the display control section 11, ETC information (vehicle driving condition information) indicating whether the road on which the car travels is a toll highway or an ordinary road.

The start detection section 22 detects whether or not the car has started. Upon detecting the start of the car, the start detection section 22 outputs, to the display control section 11, start detection information (vehicle driving condition information) indicating the start of the car. For example, the detection of the start by the start detection section 22 is performed by detecting the pressing of the accelerator or detecting the start of the rotation of the axle.

The device activation detection section 14 detects that the engine of the car is started. Upon detecting the start of the engine, the device activation detection section 14 outputs, to the display control section 11, device activation information (vehicle driving condition information) indicating the start of the engine.

The image component database 12 stores sets of 3-D image data based on which image components displayed on the display section 13 are generated. It is noted that the sets of 3-D image data corresponding to the respective image components are generated in advance. Examples of the image components include a speed meter for showing the speed of the car, a tachometer for showing the engine revolutions, and an in-car temperature image for display a temperature in the car.

Figure 2:
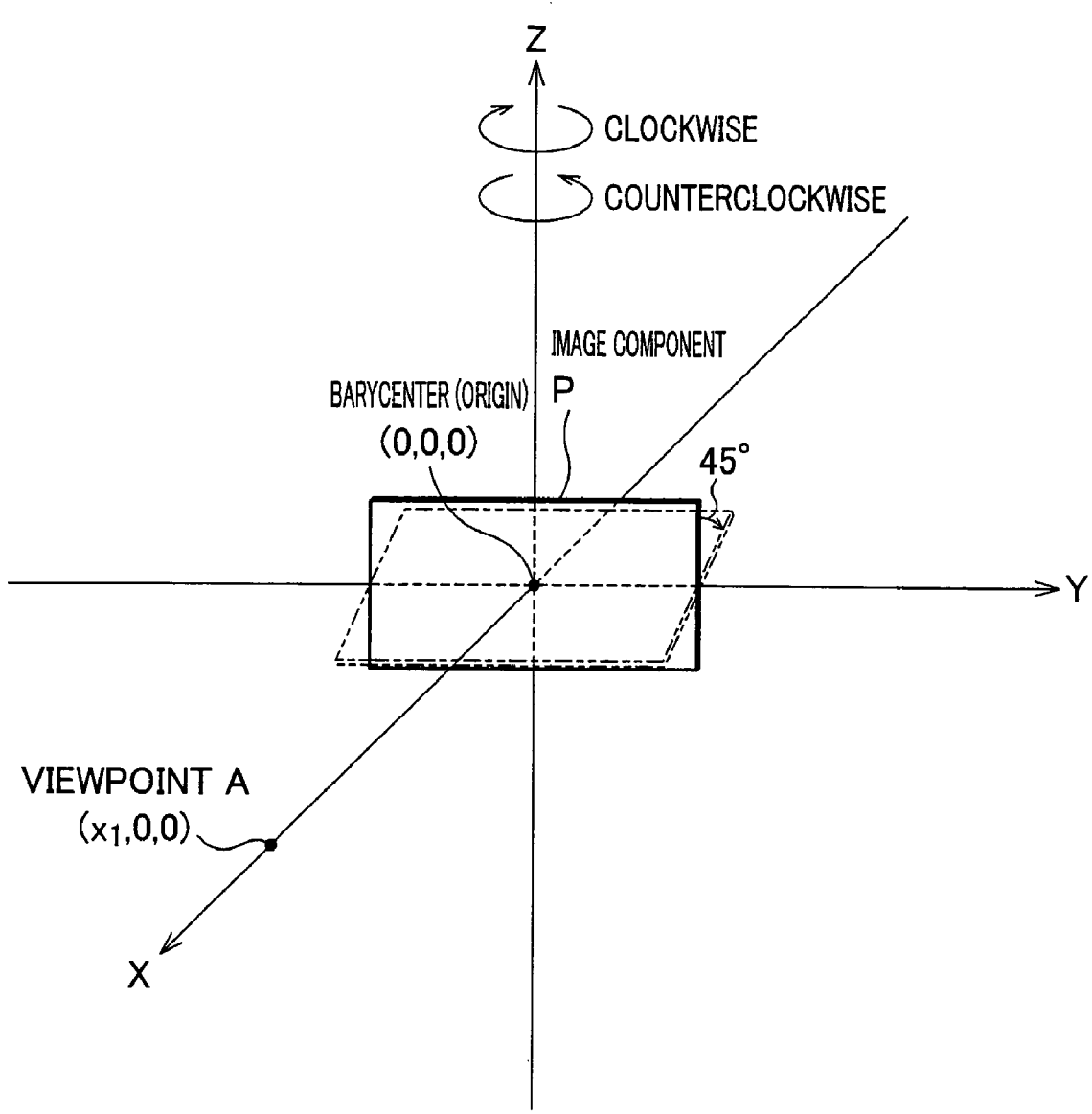
FIG. 2 shows an example of an image component stored in an image component database in the automotive display device of FIG. 1.

FIG. 2 illustrates an example of an outline of an image component (image component P) stored in the image component database 12. As shown in this figure, the image component P is, for instance, a 3-D image represented by 3-D coordinates X, Y, and Z, and the barycenter of the 3-D image is at the origin.

The display section 13 is made up of a liquid crystal panel and is long from side to side, i.e. having an aspect ratio (of the display region) of, for instance, 7:3.

As shown in FIG. 1, the display control section 11 includes an image component reading section 111, an image component temporary memory 112, an image processing section 113, an image display processing section 114, and an image component display information storage section 115.

The image component display information storage section 115 stores, in association with one another, (i) the type of an image component displayed on the display section 13, (ii) the rotational state of each image component, (iii) arrangement coordinates of each image component on the display section 13, and (iv) the condition of the car.

The rotational state of the image component indicates a rotational state of an image component represented in a 3-D coordination system as shown in FIG. 2. Examples of the rotational states include a basic state where the image component is not rotated, and a state where the image component in the basic state is rotated an angle of 45° around a Y axis (in this case, a clockwise direction with respect to the Y axis is regarded as a forward direction).

Figure 3:
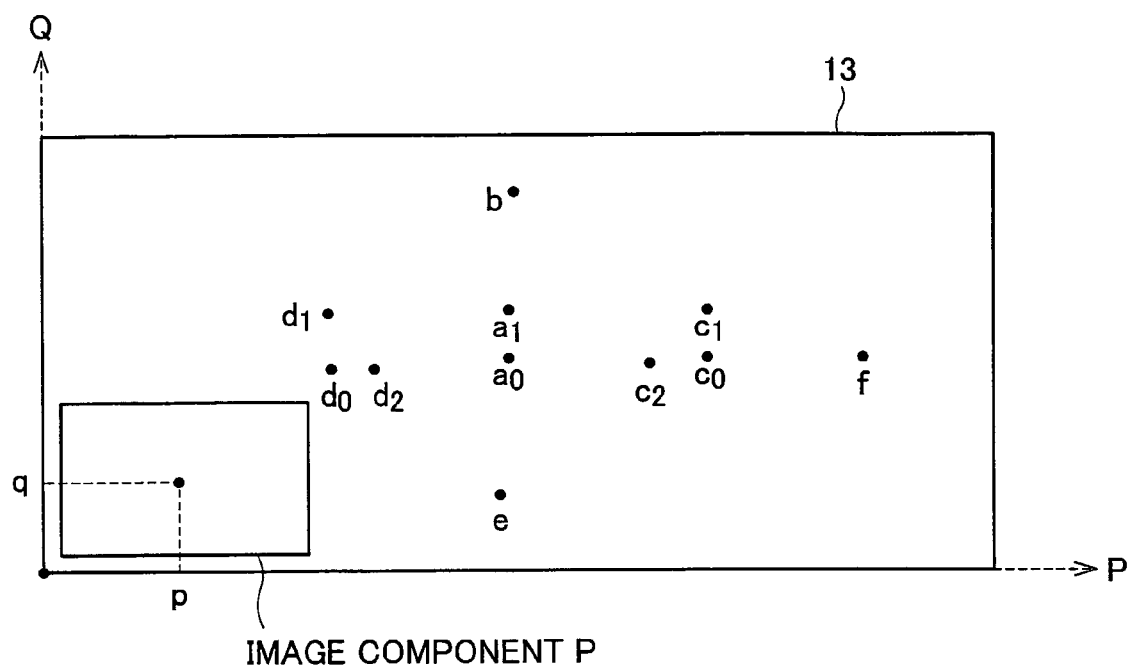
FIG. 3 illustrates the relationship between a display section of the automotive display device of FIG. 1 and coordinates where the image components are placed.

The arrangement coordinates are coordinates of the image component on the display section 13. In the display section 13, it is possible to specify an internal point by biaxial coordinates P and Q, as exemplified in FIG. 3. In a case where the barycenter of the image component P, which is seen from a viewpoint A, is at the coordinates (p, q) on the display section 13, the arrangement coordinates are at the coordinates (p, q). It is noted that the points a0, a1, b, c0, c1, c2, d0, d1, d2, e, and f in FIG. 3 are specific examples of the points specified by the arrangement coordinates.

Referring to the image component display information storage section 115, the image component reading section 111 selects an image component corresponding to the vehicle driving condition information outputted from the ETC information detection section 21, the start detection section 22, or the device activation detection section 14, so as to read out, from the image component database 12, a set of 3-D image data corresponding to the image component thus selected. The image component reading section 111 then stores the set of 3-D image data in the image component temporary memory 112.

The image processing section 113 generates a vehicle information image of an image component seen from a fixed viewpoint (in this case, the viewpoint A shown in FIG. 2), based on the 3-D image data stored in the image component temporary memory 112. The vehicle information image is an image in perspective, i.e. in the image nearby objects are large while distant objects are small. Referring to the image component display information storage section 115, the image processing section 113 determines a rotational state corresponding to the vehicle driving condition information and the image component read out from the image component temporary memory 112. The image processing section 113 then rotates the image component which has been read out from the image component temporary memory 112, in line with the rotational state thus determined. Consequently, the image processing section 113 rotates the image component read out from the image component temporary memory 112, in accordance with the rotational state thus determined, and generates the vehicle information image seen from the viewpoint A.

Assume that the image component display information storage section 115 stores so as to associate the image component P shown in FIG. 2 with the rotational state "basic state". In this case, the image processing section 113 does not rotate the image component P, thereby generating a basic vehicle information image (first vehicle information image) as shown in FIG. 4(a). Meanwhile, if the image component display information storage section 115 stores so as to associate the image component P shown in FIG. 2 with the rotational state "rotation axis: Y axis, and rotation angle: 45°", the image processing section 113 rotates the image component P clockwise around the Y axis, for an angle of 45°. As a result, the image processing section 113 generates a rotated vehicle information image (second vehicle information image) shown in FIG. 4(b).

The image display processing section 114 causes the display section 13 to display the vehicle information image of each image component outputted from the image processing section 113. On this occasion, the image display processing section 113 determines the arrangement coordinates of each image component on the display section 13, in reference to the image component display information storage section 115.

The image display processing section 114 obtains, from the display information sensor system 3, a set of display information corresponding to each image component, adds the obtained display information to the image component, and display the image component. For instance, in a case where the image component is a speed meter, the image display processing section 114 obtains current speed information from the speed sensor 31, adds the obtained speed information to the speed meter, and display the speed meter on the display section 13.

Example 1

The following will describe a specific example of the present embodiment. The image component database 12 of Example stores, as the image components, a speed/tachometer $P_3$ in which a speed meter is integrated with a tachometer, and a numeric speed display image $P_4$ that numerically shows the car speed.

The image component display information storage section 115 stores a table shown in FIG. 5. That is to say, the image component display information storage section 115 stores, in association with one another, (i) a car condition where the road on which the car travels is "ordinary road" or the device has been activated, (ii) the speed/tacho-meter $P_3$ displayed in the rotational state "basic state" and at the arrangement coordinates a0, and (iii) the numeric speed display image $P_4$ displayed in the rotational state "basic state" and at the arrangement coordinates b. Also, the image component display information storage section 115 stores, in association with one another, (i) a car condition where the road on which the car travels is "toll highway", (ii) the speed/tacho-meter $P_3$ displayed in the rotational state "rotation axis: Y axis, and rotation angle: 45°" and at the arrangement coordinates a1, and (iii) the numeric speed display image $P_4$ displayed in the rotation state "basic state" and at the arrangement coordinates b.

Referring to FIGS. 2-8, a processing flow of the present example will be discussed.

Figure 6:
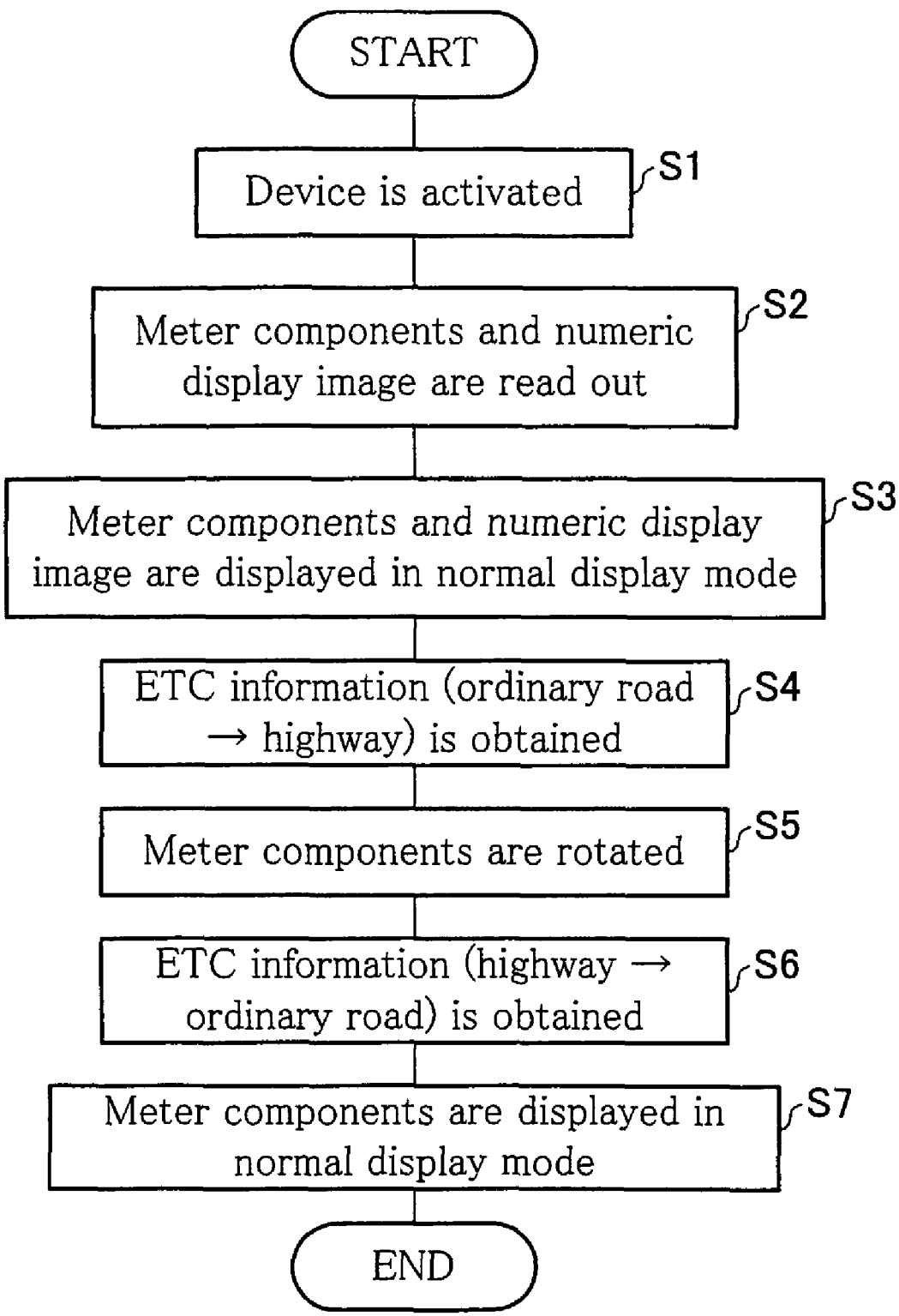
FIG. 6 is a flowchart showing a process in the automotive display device of Example 1.

FIG. 6 is a flowchart showing the process in the automotive display device 1 of the present example.

First, in Step 1 (hereinafter, simply referred to as, for instance, S1), the device activation detection section 14 detects that the engine has been started, and outputs, to the display control section 11, the device activation information indicating the start of the engine.

Upon receiving the device activation information from the device activation detection section 14, the image component reading section 111 selects the image components corresponding to the car condition "device has just been activated" as image components to be read out from the image component database 12, in reference to the image component display information storage section 115. The image component reading section 111 then reads out, from the image component database 12, sets of 3-D image data corresponding to the image components thus selected. In the present case, in reference to the table shown in FIG. 5, the image component reading section 111 reads out the speed/tacho-meter $P_3$ and the numeric speed display image $P_4$ from the image component database 12, so as to store, in the image component temporary memory 112, the image components thus read out (S2). Note that, in the descriptions below, the speed/tacho-meter $P_3$ may be termed meter component at times.

The image processing section 113 then reads out the image components from the image component temporary memory 112. Subsequently, referring to the image component display information storage section 115, the image processing section 113 determines a rotational state corresponding to the car condition "device has just been activated" and the image components thus read out. In the present case, the image processing section 113 selects the rotational state "basic state", for both the speed/tacho-meter $P_3$ and the numeric speed display image $P_4$. Then the image processing section 113 generates basic vehicle information images seen from the viewpoint A (see FIG. 2), without rotating the image components thus read out, and the image processing section 113 outputs, to the image display processing section 114, the basic vehicle information images thus generated. Subsequently, the image display processing section 114 adds display information, which is supplied from the display information sensor system 3, to the respective vehicle information images, so as to display these images on the display section 13 (S3).

At this point, the image display processing section 114 determines the arrangement coordinates corresponding to the car condition "device has just been activated" and the image components having been supplied, in reference to the image component display information storage section 115. In the present case, the image display processing section 114 selects the arrangement coordinates a0 (see FIG. 3) for the speed/tacho-meter $P_3$, and selects the arrangement coordinates b (see FIG. 3) for the numeric speed display image $P_4$. Note that, hereinafter, a case where the image processing section 113 displays, on the display section 13, a basic vehicle information image in the rotation state "basic state" is termed "normal display".

Figure 7:
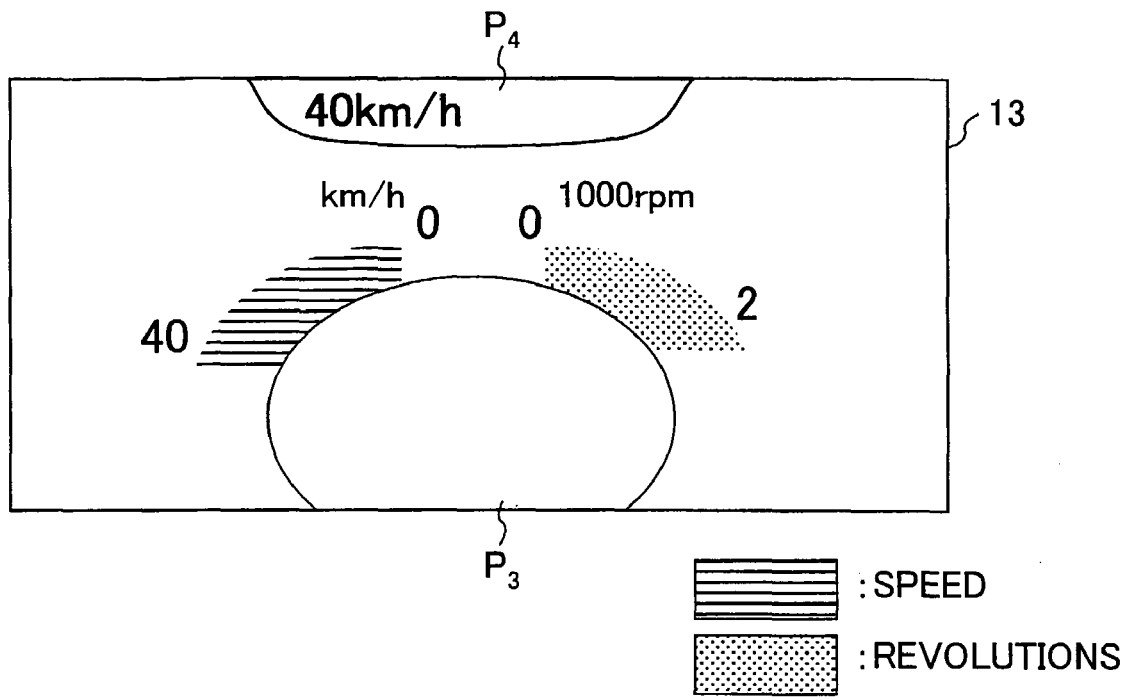
FIG. 7 illustrates an example of display on a display section of Embodiment 1, while traveling on a general road.

FIG. 7 shows an example of display on the display section 13 after the processing in S3. As shown in this figure, the display section 13 displays a basic-state speed/tacho-meter $P_3$ at the arrangement coordinates a0 (see FIG. 3), and a basic-state numeric speed display image $P_4$ at the arrangement coordinates b (see FIG. 3).

Note that, the basic-state speed/tacho-meter $P_3$ having not been rotated is long in length, so that the lower part thereof (corresponding to, for instance, a high-speed region more than 100 km/h) is not displayed. However, since the car usually travels on an ordinary road just after the device is activated, it is unnecessary to display the high-speed region. On this account, no problem occurs even if a part (high-speed region) of the speed/tacho-meter P3 is not displayed. On the contrary, since the size of a low-speed region displayed on the display section 13 is large, the user can easily recognize the change in speed, when traveling on an ordinary road where the low-speed region is frequently looked at.

Getting on a toll highway, the display control section 11 obtains, from the ETC information detection section 21, vehicle driving condition information (ETC information) indicating that the car travels on a toll highway (S4).

In the display control section 11 having obtained the ETC information indicating that the car travels on a toll highway, the image component reading section 111 selects image components (the speed/tacho-meter $P_3$ and the numeric speed display image $P_4$ in this case) corresponding to the car condition "toll highway", in reference to the image component display information storage section 115. In this case, since the selected image components are identical with those read out from the image component database in S2, the image component reading section 111 does not perform the reading at this stage.

Subsequently, in S5, the image processing section 113 selects the rotational state "rotation axis: Y axis, and rotation angle: 45°" corresponding to the car condition "toll highway" and the speed/tacho-meter $P_3$. Then the image processing section 113 rotates (as indicated by a dotted line in FIG. 2) the speed/tacho-meter $P_3$ in accordance with the selected rotational state, so as to generate a rotated vehicle information image seen from the viewpoint A. The image display processing section 114 then displays, at the arrangement coordinates a1 on the display section 13, the rotated vehicle information image generated by the image processing section 113.

Figure 4:
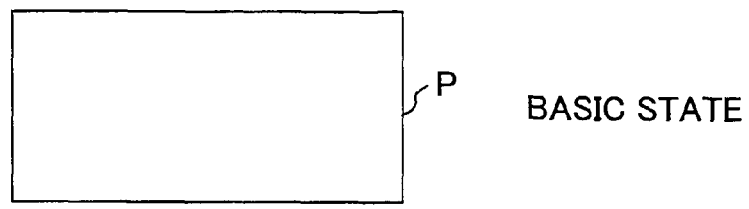
FIG. 4(a) shows a first vehicle information image in a case that the image component shown in FIG. 2 has not been rotated.
FIG. 4(b) shows a second vehicle information image in a case that the image component has been rotated.
Figure 4:
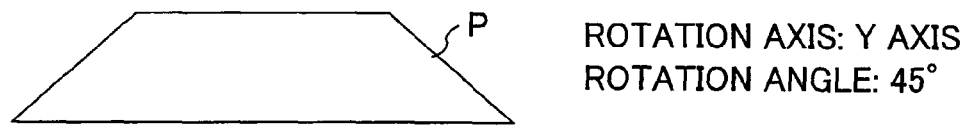
Figure 8:
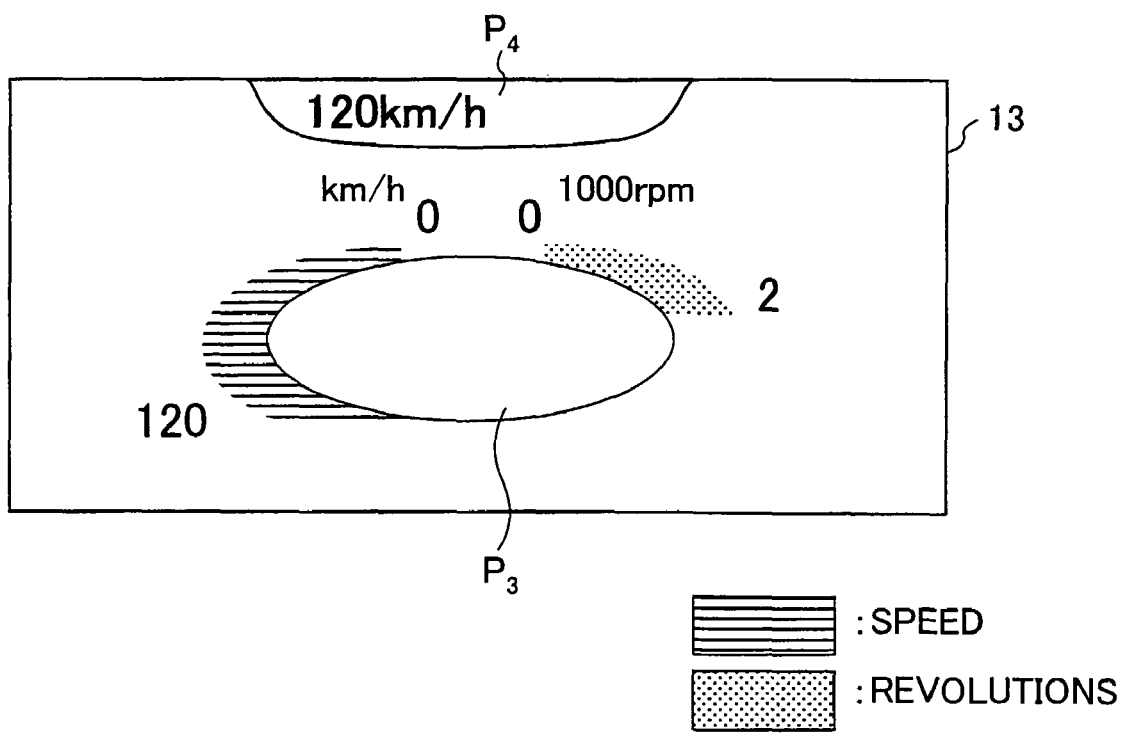
FIG. 8 illustrated an example of display on the display section of Example 1, while traveling on a highway.

FIG. 8 illustrates an example of display on the display section 13 after the processing in S5. As shown in this figure, the display section 13 displays, at the arrangement coordinates a1 (see FIG. 3), the vehicle information image of the speed/tacho-meter $P_3$ which has been rotated in accordance with the rotational state "rotation axis: Y axis, and rotation angle: 45°". Therefore, as shown in FIG. 4, the user can promptly recognize that the speed/tacho-meter $P_3$ after the processing in S3 and the rotated speed/tacho-meter $P_3$ after the processing in S5 are based on an identical image component.

The speed/tacho-meter $P_3$ shown in FIG. 8 is a vehicle information image having been rotated in accordance with the rotational state "rotation axis: Y axis, and rotation angle: 45°". On this account, the length of this vehicle information image is shorter than the basic vehicle information image before the rotation (i.e. the image in the basic state). Therefore, while traveling on a highway, the automotive display device 1 can cause the display section 13 to display a high-speed region of the speed/tacho-meter $P_3$. Furthermore, since the length of the vehicle information image of the speed/tacho-meter $P_3$ is shortened, the image display processing section 114 moves the arrangement coordinates of the speed/tacho-meter $P_3$ upward on the display section 13. With this, the image display processing section 114 can surely display, on the display section 13, a high-speed region which is not displayed in the case of FIG. 7.

Note that, the image processing section 113 preferably generates a series of rotated vehicle information images that serially show the rotation of the speed/tacho-meter $P_3$ from the basic state to the rotational state "rotation axis: Y axis, and rotation angle: 45°". With this, the image display processing section 114 can show how the speed/tacho-meter $P_3$ is rotated. As a result, the user can surely recognize that the speed/tacho-meter $P_3$ is continuously displayed on the display section 13.

In a similar manner, the image display processing section 114 preferably shows how the arrangement coordinates of the speed/tacho-meter $P_3$ continuously change from the arrangement coordinates a0 to the arrangement coordinates a1. With this, the user can surely recognize that the speed/tacho-meter $P_3$ is continuously displayed on the display section 13.

Subsequently, when the car gets off the toll highway, the display control section 11 obtains, from the ETC information detection section 21, ETC information indicating that the road on which the car travels is an ordinary road (S6).

In the display control section 11 having obtained the ETC information indicating that the car travels on an ordinary road, the image processing section 113 selects a rotational state "basic state" corresponding to the car condition "ordinary road" and the speed/tacho-meter $P_3$, in reference to the image component display information storage section 115 (see FIG. 5). With this, the image processing section 113 causes the speed/tacho-meter $P_3$ to rotate back to the basic state, and generates a basic vehicle information image of the speed/tacho-meter $P_3$ seen from the viewpoint A. Subsequently, the image display processing section 114 displays the speed/tacho-meter $P_3$ at the arrangement coordinates a0 on the display section 13. With this, the display section 13 displays the meter component, in "normal display" mode (S7).

In this case, the image processing section 113 preferably generates a series of rotated vehicle information images that serially show the rotation of the speed/tacho-meter $P_3$ from the rotational state "rotation axis: Y axis, and rotation angle: 45°" to the basic state. With this, the image display processing section 114 can perform display as if the speed/tacho-meter $P_3$ is continuously rotated. In other words, the user can see, on the display section 13, how the speed/tacho-meter $P_3$ rotates back to the normal display. As a result, the user can surely recognize that the speed/tacho-meter $P_3$ is continuously displayed on the display section 13.

Subsequently, in response to a user's instruction, the power supply to the automotive display device 1 is stopped, so that the processing finishes.

Example 2

Another example of the present embodiment will be described. The image component database 12 of Example 2 stores, as image components, a speed meter $P_5$, a tachometer $P_6$, and a rest area mileage display image $P_7$.

The image component display information storage section 115 stores a table shown in FIG. 9. That is to say, the image component display information storage section 115 stores image components to be displayed, rotational states of the image components, and arrangement coordinates of the image components, in association with car conditions where the road on which the car travels is "ordinary road" or the device has been activated, and where the road on which the car travels is "toll highway".

Referring to FIGS. 2, 3, and 9-13, a processing flow of the present example will be discussed.

Figure 10:
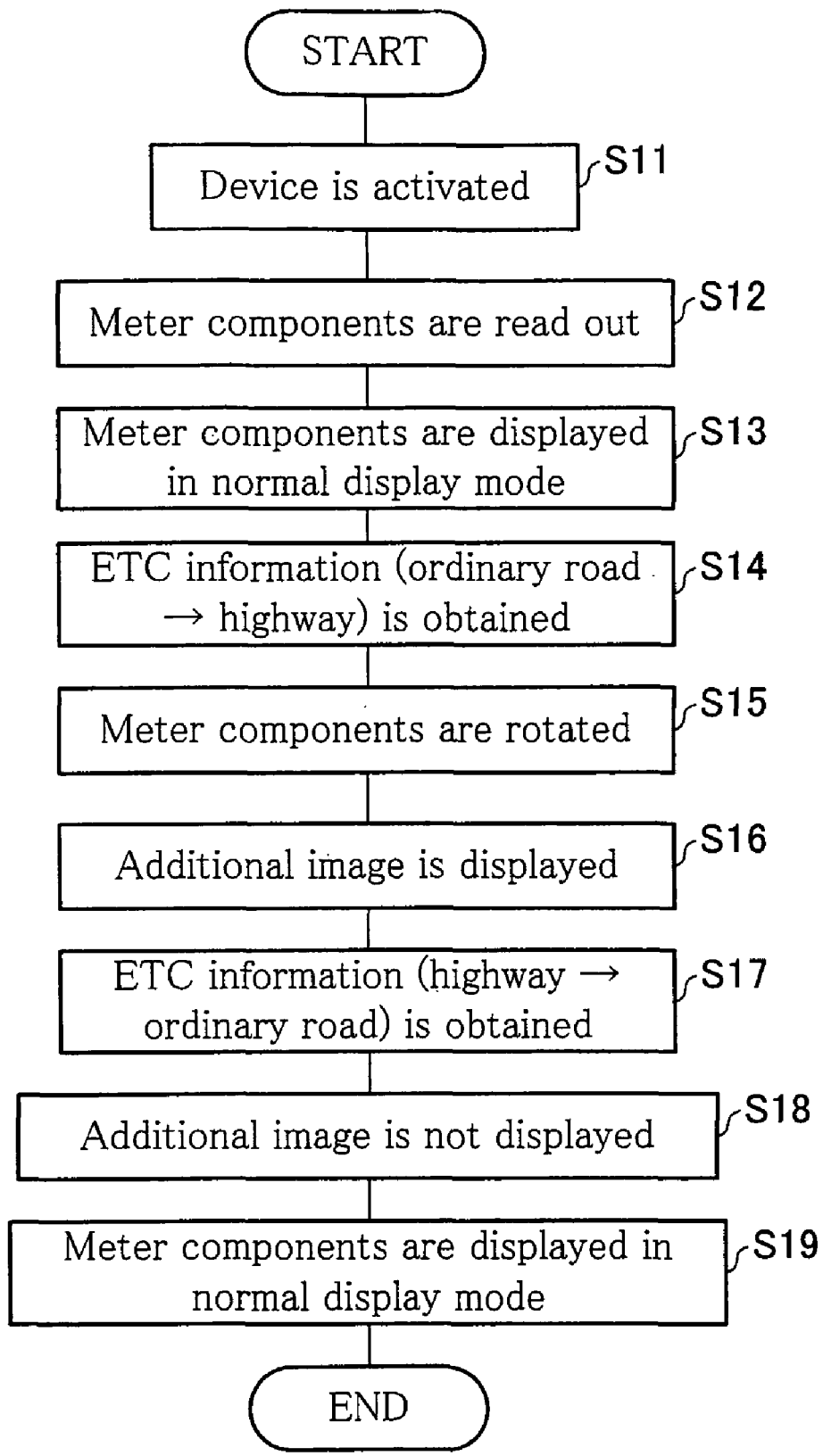
FIG. 10 is a flowchart showing a process in the automotive display device of Example 2.

FIG. 10 shows a flowchart of the processing in the automotive display device 1 of the present embodiment.

First, in S11, the device activation detection section 14 outputs, to the display control section 11, device activation information indicating that the engine has been started.

The image component reading section 111 then selects image components (in this case, the speed meter $P_5$ and the tachometer $P_6$. Hereinafter, the speed meter $P_5$ and the tachometer $P_6$ may be termed meter components at times) corresponding to the car condition "device has just been activated", in reference to the image component display information storage section 115. Subsequently, the image component reading section 111 reads out the selected image components from the image component database 12, thereby storing, in the image component temporary memory 112, the image components thus read out (S12).

Then the image processing section 113 reads out the image components from the image component temporary memory 112, and determines the rotational state corresponding to the car condition "device has just been activated" and the image components thus read out, in reference to the image component display information storage section 115. In this case, the image processing section 113 selects "basic state" for both the speed meter $P_5$ and the tachometer $P_6$. The image processing section 113 then generates a basic vehicle information image seen from the viewpoint A (see FIG. 2), without rotating the image components thus read out.

Subsequently, the image display processing section 114 displays, on the display section 13 and in the normal display mode, a basic vehicle information image to which display information (in this case, speed information from the speed sensor 31 and engine revolutions information from the engine revolutions sensor 32) supplied from the display information sensor system 3 has been added (S13).

On this occasion, the image display processing section 114 determines the arrangement coordinates (in this case, the arrangement coordinates d0 (see FIG. 3) for the speed meter $P_5$ and the arrangement coordinates c0 (see FIG. 3) for the tachometer $P_6$) corresponding to the car condition "device has just been activated" and the image components, in reference to the image component display information storage section 115.

Figure 11:
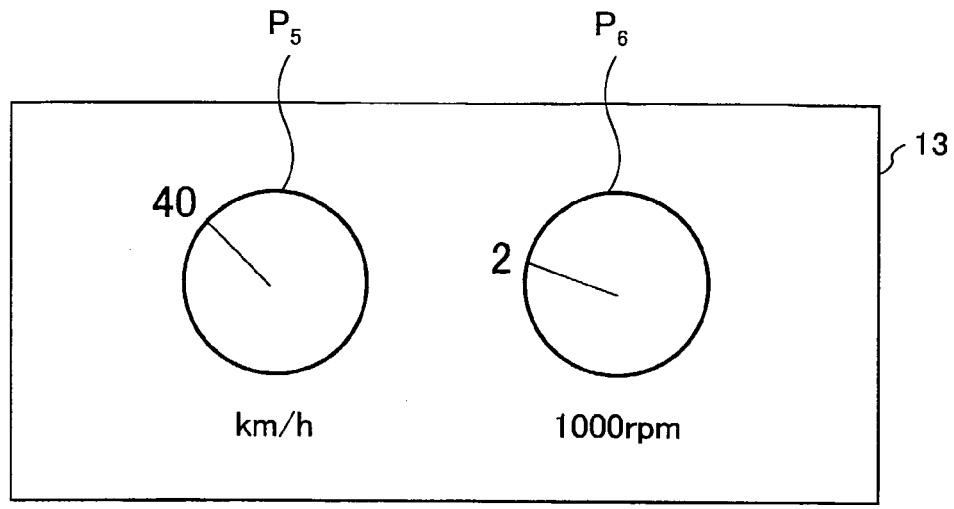
FIG. 11 illustrates an example of display on a display section of Example 2, while traveling on an ordinary road.

FIG. 11 shows an example of display on the display section 13 after the processing in S13. As shown in this figure, the display section 13 displays, at the arrangement coordinates d0 (see FIG. 3), a basic-state speed meter $P_5$ seen from the viewpoint A. The display section 13 also displays, at the arrangement coordinates c0 (see FIG. 3), a basic-state tachometer $P_6$ seen from the viewpoint A.

Subsequently, when the car gets on a toll highway, the display control section 11 obtains, from the ETC information detection section 21, ETC information indicating that the road on which the car travels is a toll highway (S14).

In the display control section 11 having obtained the ETC information indicating that the road on which the car travels is a toll highway, the image processing section 113 selects the rotational state "rotation axis: Y axis, and rotation angle: 45°" as the rotation state corresponding to the car condition "toll highway" and the speed meter $P_5$. In a similar manner, the image processing section 113 selects the rotational state "rotation axis: Y axis, and rotation angle: 45°" for the tachometer $P_6$.

Then the image processing section 113 rotates the speed meter $P_5$ and the tachometer $P_6$ for an angle of 45° around the Y axis, thereby generating the vehicle information images seen from the viewpoint A (S15). Subsequently, the image display processing section 114 displays the vehicle information images on the display section 13. With this, the user recognizes as if the speed meter $P_5$ and the tachometer $P_6$ are rotated.

On this occasion, the image display processing section 114 determines the arrangement coordinates (in this case, the arrangement coordinates d1 (see FIG. 3) for the speed meter $P_5$, and the arrangement coordinates c1 (see FIG. 3) for the tachometer $P_6$) corresponding to the car condition "toll highway" and the image components, in reference to the image component display information storage section 115.

After performing the rotation by the image processing section 113, the image component reading section 111 selects, as image components to be displayed, image components (in this case, the speed meter $P_5$, the tachometer $P_6$, and the rest area mileage display image $P_7$) corresponding to the car condition "toll highway", in reference to the image component display information storage section 115.

On this occasion, in reference to the image component temporary memory 112, the image component reading section 111 recognizes that the speed meter $P_5$ and the tachometer $P_6$ have already been read out, thereby determining that only the rest area mileage display image $P_7$ is the image component to be added. Then the image component reading section 111 reads out, from the image component database 12, a set of 3-D image data corresponding to the rest area mileage display image $P_7$ to be added, so as to store, in the image component temporary memory 112, the 3-D image data thus read out.

When the rest area mileage display image $P_7$ is stored in the image component temporary memory 112, the image processing section 113 determines the rotational state ("basic state" in this case) corresponding to the car condition "toll highway" and the rest area mileage display image $P_7$, in reference to the image component display information storage section 115 (see Table in FIG. 9). In accordance with the determined rotational state "basic state", the image processing section 113 then generates a vehicle information image of the rest area mileage display image $P_7$ seen from the viewpoint A, without rotating the rest area mileage display image $P_7$.

Subsequently, the image display processing section 114 determines the arrangement coordinates (in this case, arrangement coordinates e (see FIG. 3)) corresponding to the car condition "toll highway" and the rest area mileage display image $P_7$, in reference to the image component display information storage section 115. The image display processing section 114 then obtains, from the navigation system 4, information with regard to a current position and a distance to a rest area, thereby displaying, on the display section 13, the rest area mileage display image $P_7$ which is the additional image component (S16).

Figure 12:
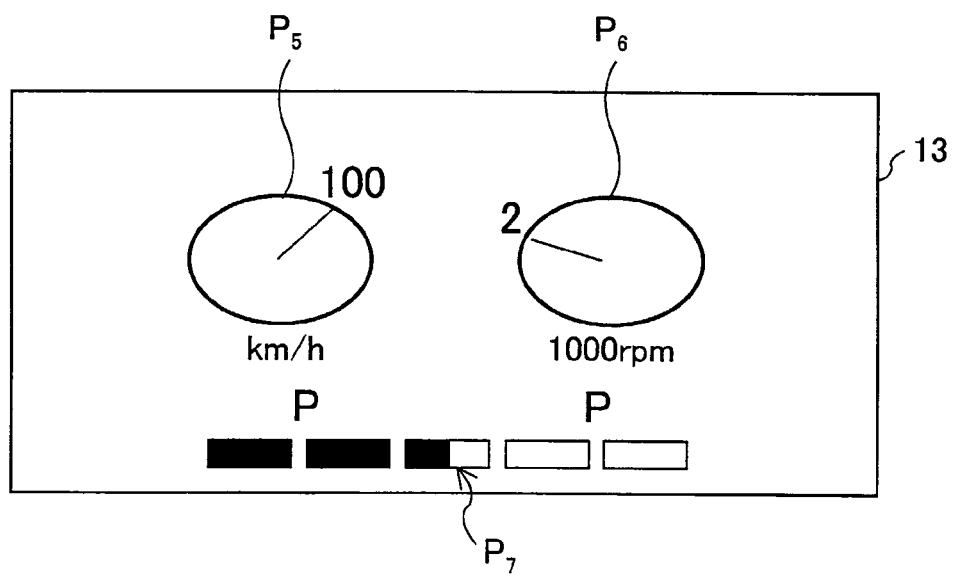
FIG. 12 illustrates an example of display on the display section of Example 2, while traveling on a highway.

FIG. 12 shows an example of display on the display section 13 after the processing in S16. As shown in FIG. 12, the display control section 11 rotates the speed meter $P_5$ and the tachometer $P_6$, so as to narrows the vehicle information images of the speed meter $P_5$ in lengthwise and the tachometer $P_6$, in order to enlarge a space where the additional image is displayed.

Furthermore, the image display processing section 114 moves the speed meter $P_5$ and the tachometer $P_6$ from the arrangement coordinates c0 and d0 to the arrangement coordinates c1 and d1 (see FIG. 3), in order to further enlarge a space below the speed meter $P_5$ and the tachometer $P_6$.

With this, the image display processing section 114 can display, on the display section 13, the rest area mileage display image $P_7$ that is an additional image. As a result, the user can check the rest area mileage information required while traveling on a highway.

Getting off the toll highway, the display control section 11 obtains, from the ETC information detection section 21, ETC information indicating that the road on which the car travels is an ordinary road (S17).

In the display control section 11 having obtained the ETC information indicating that the road on which the car travels is an ordinary road, the image component reading section 111 and the image display processing section 114 recognize that the image components corresponding to the car condition "ordinary road" do not include the rest area mileage display image $P_7$, in reference to the image component display information storage section 115. The image component reading section 111 then deletes, from the image component temporary memory 112, the set of 3-D image data corresponding to the rest area mileage display image $P_7$. Also, the image display processing section 114 does not display the rest area mileage display image $P_7$ on the display section 13 (S18).

Subsequently, in reference to the image component display information storage section 115, the image processing section 113 selects "basic state" as the rotational state corresponding to the car condition "ordinary road" and the speed meter $P_5$. In like wise, the image processing section 113 selects "basic state" as the rotational state corresponding to the car condition "ordinary road" and the tachometer $P_6$, in reference to the image component display information storage section 115. The image processing section 113 then generates basic vehicle information images of the speed meter $P_5$ and the tachometer $P_6$ both in the basic state, which are seen from the viewpoint A. Subsequently, the image display processing section 114 displays, on the display section 13, the vehicle information images of the speed meter $P_5$ and the tachometer $P_6$ both in the basic state (i.e. not rotated). In this manner, the display section 13 performs the normal display of the meter components as shown in FIG. 11 (S19).

Then the power supply to the automotive display device 1 is stopped in response to an instruction from the user, so that the processing finishes.

As described above, in accordance with the ETC information, the image processing section 113 rotates the speed meter $P_5$ and the tachometer $P_6$, so as to generate vehicle information images. FIGS. 13(a) and 13(b) roughly illustrate the vehicle information images of the speed meter $P_5$ and the tachometer $P_6$. In these figures, the speed meter $P_5$ and the tachometer $P_6$ are illustrated as squares, in order to clearly give perspective to the vehicle information images. FIG. 13(a) shows the basic vehicle information images of the speed meter $P_5$ and the tachometer $P_6$ in the basic state (i.e. not rotated), while FIG. 13(b) shows the vehicle information images of the speed meter $P_5$ and the tachometer $P_6$ which are rotated for 45° around the Y axis.

As shown in FIGS. 13(a) and 13(b), the lengths of the vehicle information images after the rotation are shorter than the lengths of the basic vehicle information images in the basic state. On this account, in the display section 13, a space excluding the speed meter $P_5$ and the tachometer $P_6$ is enlarged, so that it is possible to display an additional image such as the rest area mileage display image $P_7$.

Example 3

A further example of the present embodiment will be discussed. The image component database 12 of Example 3 stores, as image components, a speed meter $P_5$, a tachometer $P_6$, and an in-vehicle temperature display image $P_8$.

Also, the image component display information storage section 115 stores a table shown in FIG. 14. That is, the image component display information storage section 115 stores image components to be displayed, rotational states of the image components, and arrangement coordinates of the image components, in association with car conditions "device has just been activated" and "after start of vehicle".

Referring to FIGS. 2, 3, and 14-18, a processing flow of the present example will be discussed.

Figure 15:
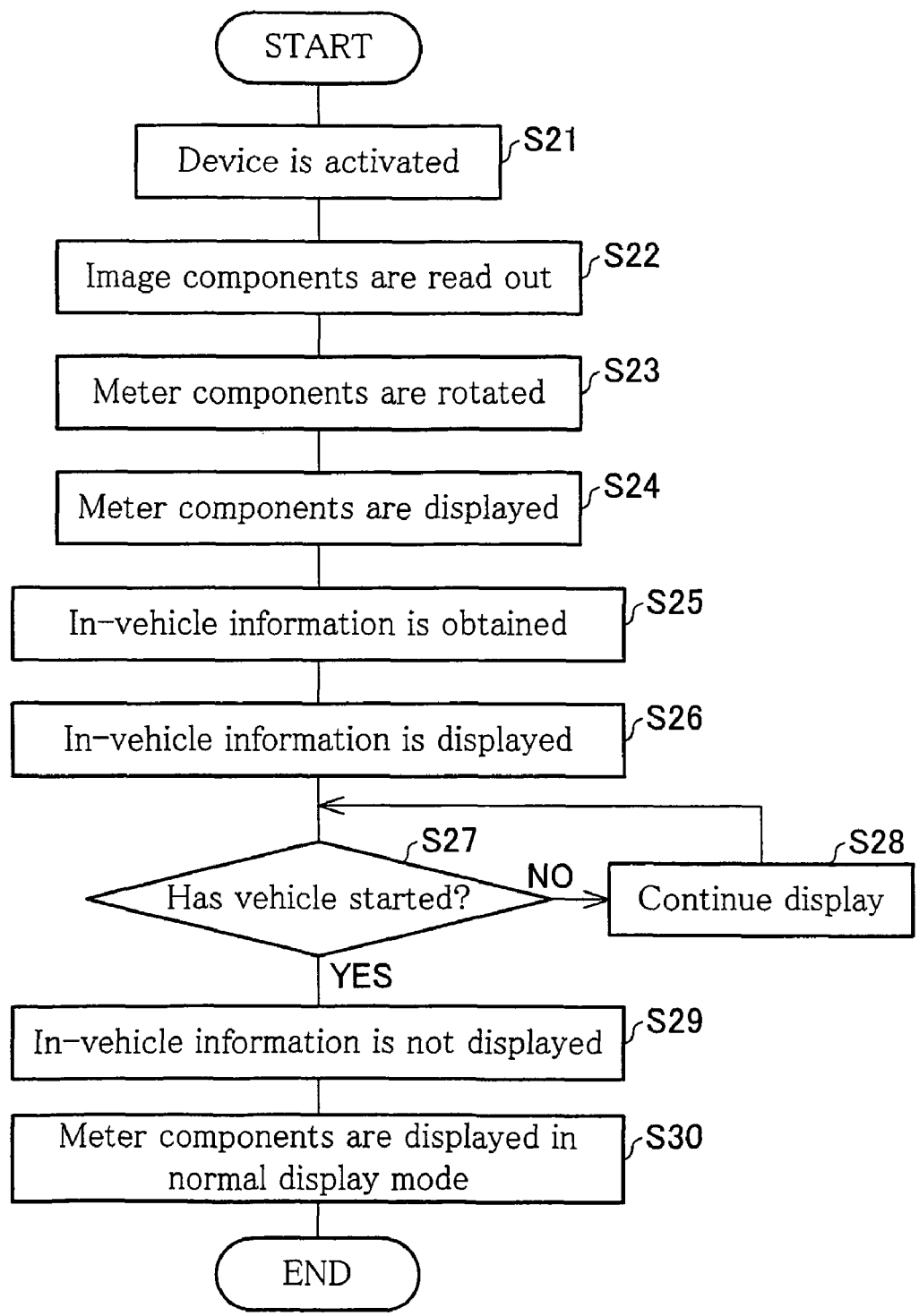
FIG. 15 is a flowchart showing a process in the automotive display device of Example 3.

FIG. 15 is a flowchart showing the processing in the automotive display device 1 of the present example.

First, in S21, the device activation detection section 14 outputs, to the display control section 11, device activation information indicating that the engine has been started.

The image component reading section 111 selects image components (the speed meter $P_5$, the tachometer $P_6$, and the in-vehicle temperature display image $P_8$ in this case) corresponding to the car condition "device has just been activated", in reference to the image component display information storage section 115. The image component reading section 111 then reads out the selected image components from the image component database 12, thereby storing, in the image component temporary memory 112, the image components thus read out (S22).

Subsequently, the image processing section 113 reads out the image components from the image component temporary memory 112, and determines the rotational states corresponding to these image components and the car condition "device has just been activated", in reference to the image component display information storage section 115. In this case, the image processing section 113 selects: the rotational state "rotation axis: Z axis, and rotation angle: −45°" for the speed meter $P_5$; the rotational state "rotation axis: Z axis, and rotation angle: 45°" for the tachometer $P_6$; and "basic state" for the in-vehicle temperature display image $P_8$.

As to the rotation angle, a clockwise direction with respect to the rotation axis is regarded as a forward direction, while a counterclockwise direction with respect to the rotation axis is regarded as a backward direction (see FIG. 2). Therefore, "rotation axis: Z axis, and rotation angle: −45°" indicates an counterclockwise rotation for 45° around the Z axis, and "rotation axis: Z axis, and rotation angle: 45°" indicates a clockwise rotation for 45° around the Z axis.

First, the image processing section 113 generates vehicle information images of image components (the speed meter $P_5$ and the tachometer $P_6$ in this case) whose rotational states are not "basic state".

The image processing section 113 rotates the speed meter $P_5$ counterclockwise, for 45° around the Z axis. Then the image processing section 113 generates a vehicle information image seen from the viewpoint A. The image processing section 113 rotates the tachometer $P_6$ clockwise for 45° around the Z axis, thereby generating a vehicle information image seen from the viewpoint A (S23).

Figure 13:
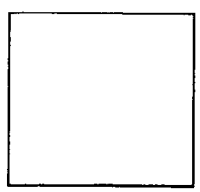
FIGS. 13(a) and 13(b) roughly illustrate a speed meter or a tachometer.
Figure 13:

More specifically, assuming that, as in the case shown in FIG. 13, the speed meter $P_5$ and the tachometer $P_6$ are shaped like square plates, a vehicle information image of the speed meter $P_5$ having been rotated counterclockwise for 45° around the Z axis is shaped as shown in FIG. 18(c). Also, a vehicle information image of the tachometer $P_6$ having been rotated clockwise for 45° around the Z axis is shaped as shown in FIG. 18(b). It is noted that FIG. 18(a) shows basic vehicle information images of the speed meter $P_5$ and the tachometer $P_6$ in the basic state (i.e. not rotated).

The image processing section 113 then outputs, to the image display processing section 114, the vehicle information image of the speed meter $P_5$ having been rotated counterclockwise for 45° around the Z axis and the vehicle information image of the tachometer $P_6$ having been rotated clockwise for 45° around the Z axis. The image display processing section 114 displays, on the display section 13, the vehicle information images of the speed meter $P_5$ and the tachometer $P_6$ which are supplemented with display information supplied from the display information sensor system 3 (in this case, the display information are speed information from the speed sensor 31 and engine revolutions information from the engine revolutions sensor 32) (S24).

On this occasion, the image display processing section 114 determines arrangement coordinates (in this case, arrangement coordinates d2 (see FIG. 3) for the speed meter $P_5$ and arrangement coordinates c2 (see FIG. 3) for the tachometer $P_6$) corresponding to the car condition "device has just been activated" and the image components, in reference to the image component display information storage section 115.

Subsequently, the image processing section 113 generates a basic vehicle information image of the in-vehicle temperature display image $P_8$ in the basic state (i.e. not rotated), thereby outputting, to the image display processing section 114, the basic vehicle information image of the in-vehicle temperature display image $P_8$ thus generated. Upon receiving the basic vehicle information image of the in-vehicle temperature display image $P_8$, the image display processing section 114 obtains, from the in-vehicle temperature sensor 33, in-car temperature information (in this case, a temperature in a front seat is 21.0° C. while a temperature in a rear seat is 23.0° C.) (S25).

The image display processing section 114 then displays, on the display section 13, the basic vehicle information image of the in-vehicle temperature display image $P_8$ to which the in-car temperature information is added (S26).

On this occasion, the image display processing section 114 determines arrangement coordinates (in this case, arrangement coordinates f (see FIG. 3)) corresponding to the car condition "device has just been activated" and the in-vehicle temperature display image $P_8$, in reference to the image component display information storage section 115.

Figure 16:
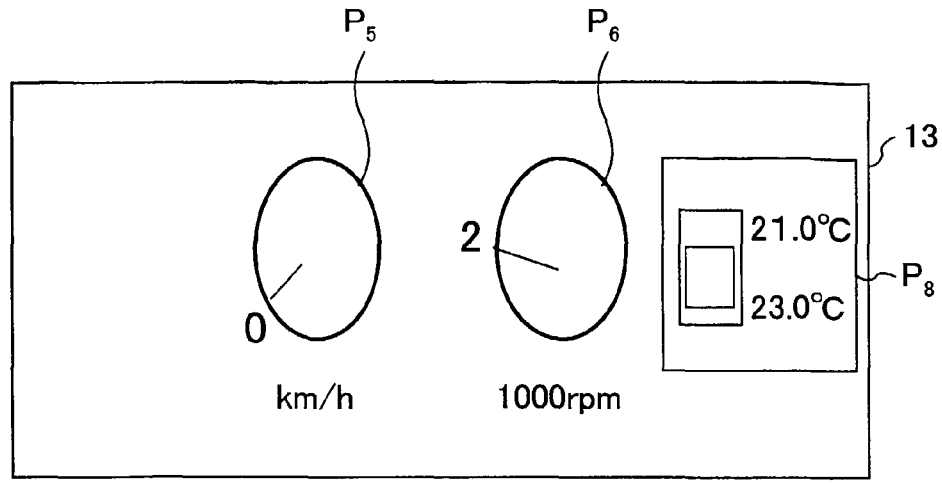
FIG. 16 illustrates an example of display on the display section of Example 3, at the time of starting the device.

FIG. 16 shows an example of display on the display section 13 after the processing in S26. As illustrated in this figure, the display section 13 displays: the speed meter $P_5$ provided at the arrangement coordinates d2 (see FIG. 3) and having been rotated counterclockwise for 45° around the Z axis; and the tachometer $P_6$ provided at the arrangement coordinates c2 (see FIG. 3) and having been rotated clockwise for 45° around the Z axis. In this case, the speed meter $P_5$ and the tachometer $P_6$ have been rotated around the longitudinal Z axis as described above. On this account, the widths of these image components have been narrowed. Therefore, as shown in FIG. 16, spaces are provided on the right and left sides of the speed meter $P_5$ and the tachometer $P_6$. On this account, the image display processing section 114 can display the in-vehicle temperature display image $P_8$ beside the tachometer $P_6$.

Subsequently, the display control section 11 determines whether or not start detection information has been supplied from the start detection section 22 (S27).

If the start detection information was not supplied from the start detection section 22 (NO in S27), the display control section 11 keeps displaying the speed meter $P_5$, the tachometer $P_6$, and the in-vehicle temperature display image $P_8$ which have been displayed during S24 and S26 (S28).

On the other hand, if the start detection information was supplied from the start detection section 22 (YES in S27), the image component reading section 111 and the image display processing section 114 recognize that image components corresponding to the car condition "after start of vehicle" do not include the in-vehicle temperature display image $P_8$, in reference to the image component display information storage section 115. The image component reading section 111 then deletes, from the image component temporary memory 112, the set of 3-D image data corresponding to the in-vehicle temperature display image $P_8$. Also, the image display processing section 114 does not display, on the display section 13, the vehicle information image of the in-vehicle temperature display image $P_8$ (S29).

Subsequently, in reference to the image component display information storage section 115, the image processing section 113 selects "basic state" as the rotational state corresponding to the car condition "after start of vehicle" and the speed meter $P_5$. In a similar manner, in reference to the image component display information storage section 115, the image processing section 113 selects "basic state" as the rotational state corresponding to the car condition "after start of vehicle" and the tachometer $P_6$.

The image processing section 113 then generates basic vehicle information images of the speed meter $P_5$ and the tachometer $P_6$ rotated back to the basic state. The image display processing section 114 then displays, on the display section 13, the basic vehicle information images of the speed meter $P_5$ and the tachometer $P_6$ seen from the viewpoint A. On this occasion, the image display processing section 114 determines arrangement coordinates (in this case, the arrangement coordinates d0 (see FIG. 3) for the speed meter $P_5$ and the arrangement coordinates c0 (see FIG. 3) for the tachometer $P_6$) corresponding to the car condition "after start of vehicle" and the image components.

Figure 17:
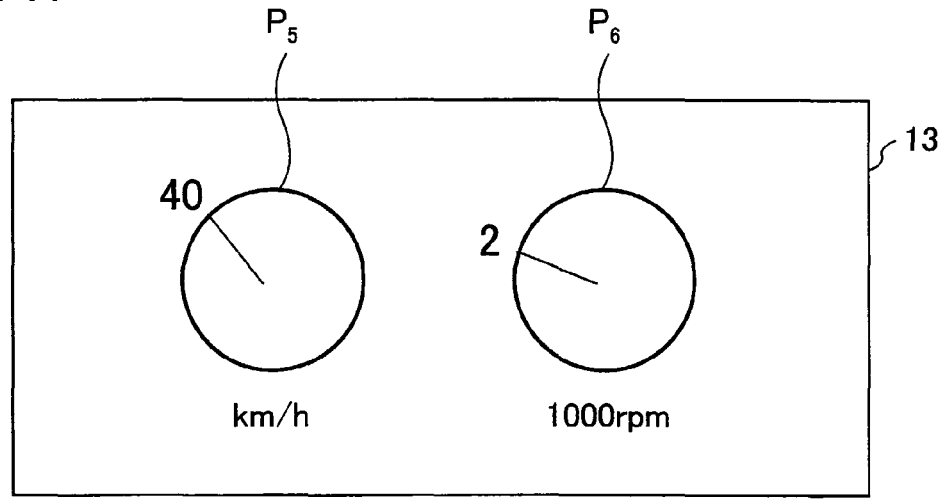
FIG. 17 illustrates an example of display on the display section of Example 3, after the start of the vehicle.

With this, the display section 13 performs normal display of the meter components as shown in FIG. 17 (S30).

Then the power supply to the automotive display device 1 is stopped in response to an instruction from the user, so that the processing finishes.

Figure 18:
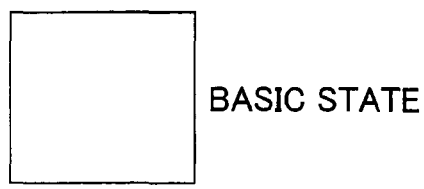
FIGS. 18(a), 18(b), and 18(c) roughly show a speed meter or tachometer.
Figure 18:
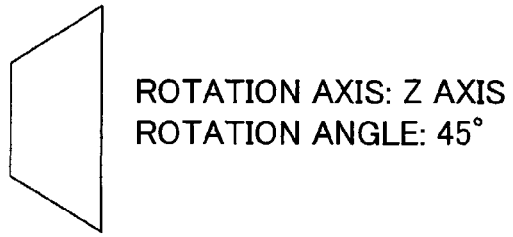
Figure 18:

As described above, during a period from the activation of the device to the start of the car, the image processing section 113 rotates the speed meter $P_5$ and the tachometer $P_6$ around the longitudinal axis Z, so as to generate vehicle information images that are narrow in width (see FIG. 18). This enlarges, in the display section 13, spaces on the right and left sides of the speed meter $P_5$ and the tachometer $P_6$. As a result, the image display processing section 114 can display an image showing in-vehicle information such as the in-vehicle temperature display image $P_8$.

Subsequently, upon receiving the start detection information from the start detection section 22, the image display processing section 114 causes the in-vehicle temperature display image $P_8$ indicating in-vehicle information to be non-display, while the image processing section 113 rotates the speed meter $P_5$ and the tachometer $P_6$ back to the basic state, so as to generate basic vehicle information images. As a result of the above, after the start of the car, the user can see the basic vehicle information images showing the speed meter $P_5$ and the tachometer $P_6$ both facing front. This allows the user to easily recognize these meter components.

Embodiment 2

In the embodiment above, the rotational state is determined for each image component. In this arrangement, it is necessary to generate a vehicle information image for each image component, so that a processing time in the image processing section 113 may be long. The present embodiment can shorten this processing time in the image processing section 113.

The following will describe the present embodiment in reference to FIGS. 19-26. By the way, members having the same functions as those described in Embodiment 1 with the figures are given the same numbers, so that the descriptions are omitted for the sake of convenience.

Figure 19:
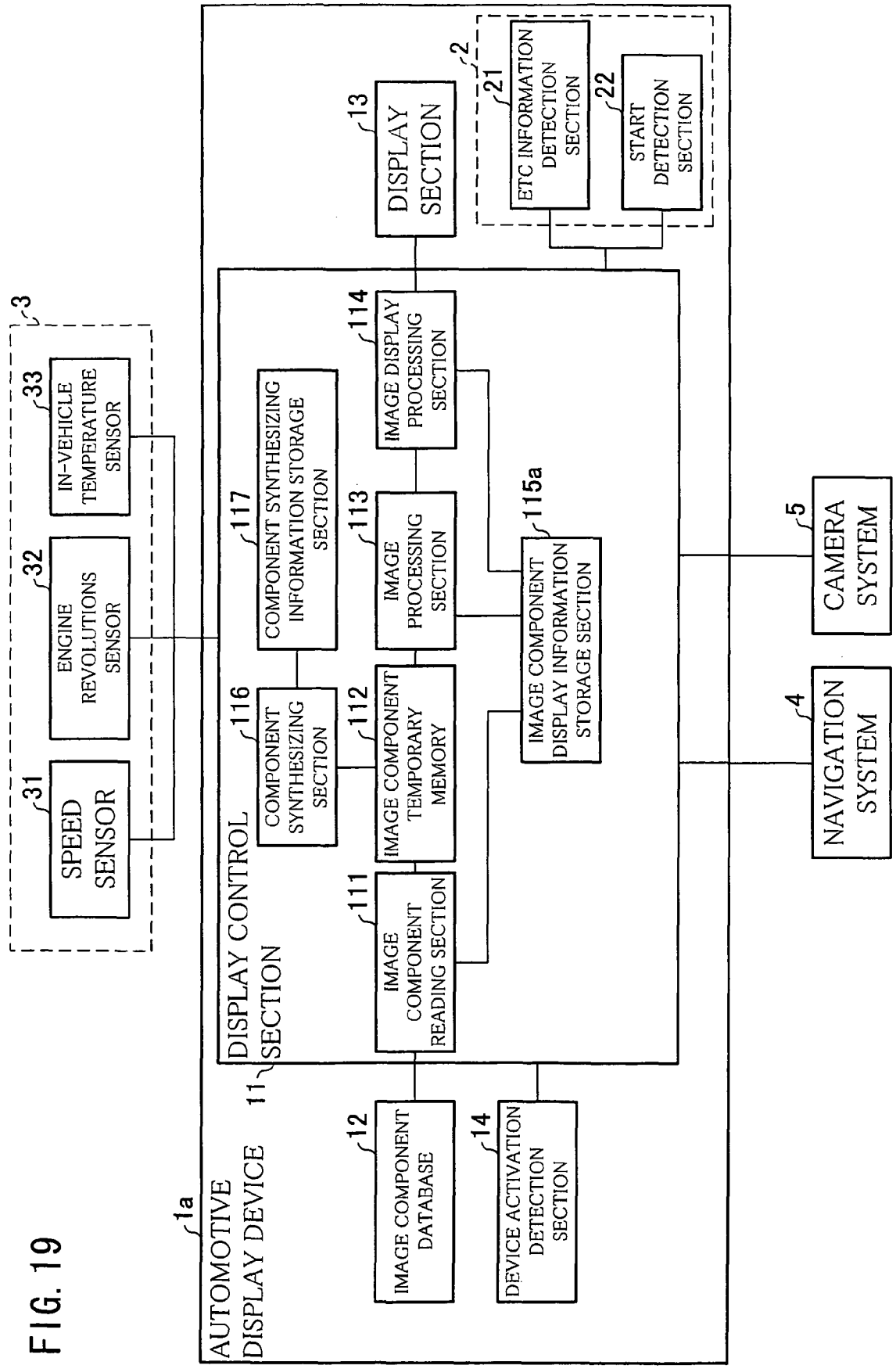
FIG. 19 is a schematic block diagram relating to another embodiment of the present invention, showing a vehicle display system including an automotive display device.

FIG. 19 is a block diagram showing a vehicle display system of the present embodiment. As shown in this figure, the vehicle display system of the present embodiment is different from that of Embodiment 1, on the point that an automotive display device 1a is provided in place of the automotive display device 1.

The automotive display device 1a includes a display control section 11a, an image component database 12, a display section 13, and a device activation detection section 14.

The display control section 11a is different from the display control section 11 of the previous embodiment, on the point that an image component display information storage section 115a is provided in place of the image component display information storage section 115, and a component synthesizing section (vehicle information image synthesizing section) 116 and a component synthesizing information storage section 117 are additionally provided.

The component synthesizing information storage section 117 stores, in association with one another, a plurality of image components (first vehicle information images) to be synthesized and barycentric positions for determining relative positions of the respective image components. FIG. 23 shows an example of the contents of the component synthesizing information storage section 117.

As illustrated in, for example, FIG. 23, the component synthesizing information storage section 117 stores a speed/tacho-meter $P_3$ and a camera activation display image $P_9$, as the image components to be synthesized. Moreover, the component synthesizing information storage section 117 memorizes that the barycentric position of the speed/tacho-meter $P_3$ is at the origin and the barycentric position of the camera activation display image $P_9$ is at coordinates (0, y3, 0).

The component synthesizing section 116 performs synthesis of a plurality of image components. In reference to the component synthesizing information storage section 117, the component synthesizing section 116 reads out, from the image component temporary memory 112, image components to be synthesized. Then the component synthesizing section 116 determines relative positions of the image components thus read out, in reference to the barycentric positions of the image components stored in the component synthesizing information storage section 117, so as to perform the synthesis of the image components. The component synthesizing section 116 stores, in the image component temporary memory 112, the image component as a result of the synthesis. Hereinafter, the image component as a result of the synthesis is termed a synthesized image component.

The image component display information storage section 115a stores, in association with one another, a type of an image component or a synthesized image component displayed on the display section 13, a rotational state of the image component or the synthesized image component, arrangement coordinates of the image component or the synthesized image component on the display section 13, and the car condition.

Example 4

One example of the present embodiment will be discussed. An image component database 12 of Example 4 stores, as image components, the speed/tacho-meter $P_3$, the camera activation display image $P_9$, and a traveling route display image $P_{10}$.

The image component display information storage section 115a stores a table shown in FIG. 22. That is, the image component display information storage section 115a stores (i) an image component or a synthesized image component and (ii) a rotational state and arrangement coordinates of the image component or the synthesized image component, (i)

and (ii) being stored in association with car conditions where the road on which the car travels is "ordinary road" or where "device has just been activated", and where the road on which the car travels is "toll highway".

In addition to the above, the component synthesizing information storage section 117 stores a table shown in FIG. 23.

Figure 24:
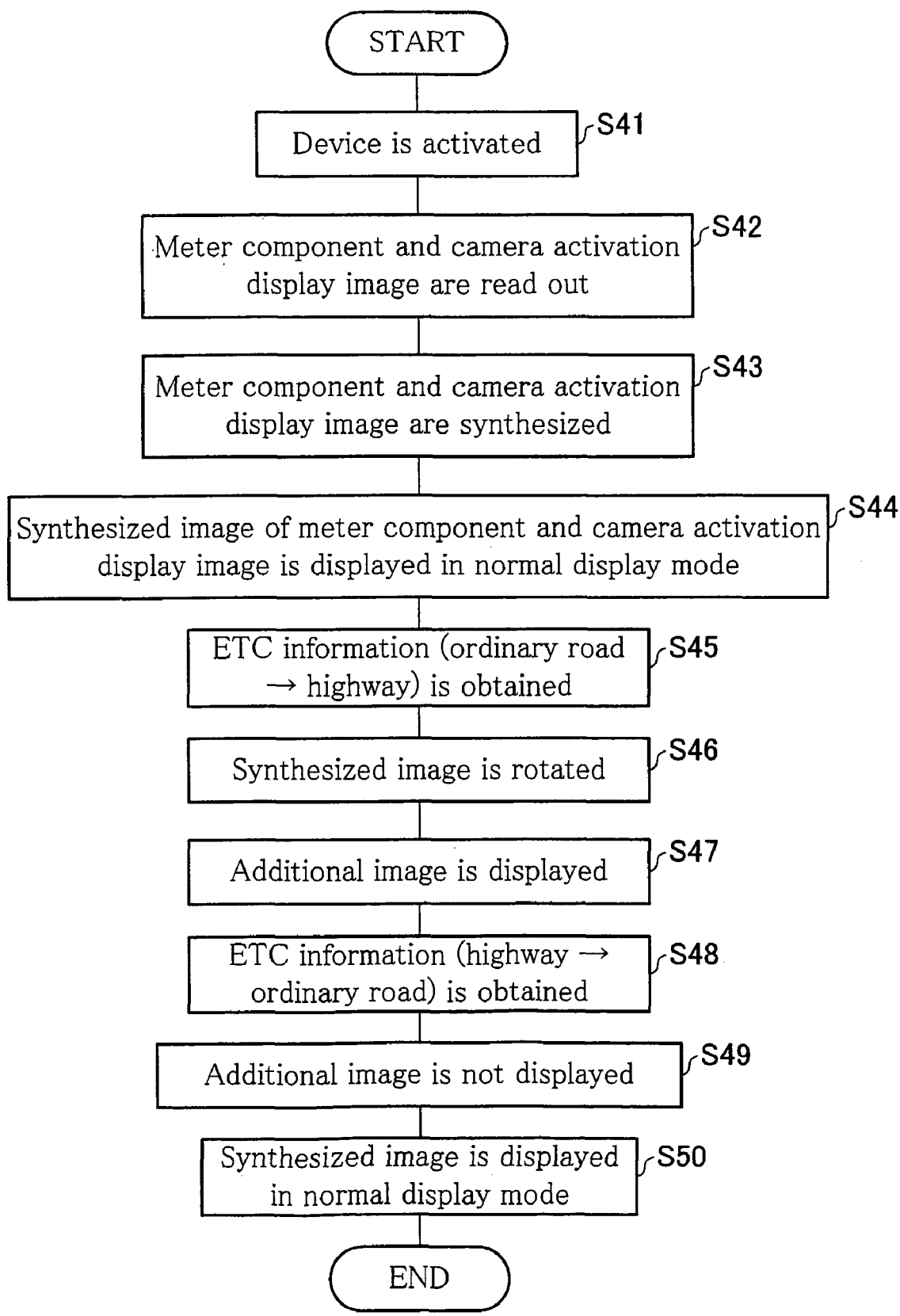
FIG. 24 is a flowchart showing a process in the automotive display device of Example 4.

Now, a processing flow of the present example will be discussed. FIG. 24 is a flowchart with regard to a process in the automotive display device 1a of the present example.

First, in S41, the device activation detection section 14 outputs, to the display control section 11a, device activation information indicating that the engine has been started.

The image component reading section 111 then selects image components (in this case, the speed/tacho-meter $P_3$ and the camera activation display image $P_9$ which are meter components) corresponding to the car condition "device has just been activated". Subsequently, the image component reading section 111 reads out, from the image component database 12, sets of 3-D image data of the respective image components thus determined, so as to store, in the image component temporary memory 112, the image components thus read out (S42).

The component synthesizing section 116 then reads out, from the image component temporary memory 112, sets of 3-D image data corresponding to the image components stored in the component synthesizing information storage section 117. In the present case, the component synthesizing section 116 reads out, from the image component temporary memory 112, the speed/tacho-meter $P_3$ and the camera activation display image $P_9$.

In reference to the table in FIG. 23, the component synthesizing section 116 sets the barycentric position of the speed/tachometer $P_3$ at the origin, and also sets the barycentric position of the camera activation display image $P_9$ at XYZ 3-D coordinates (0, y3, 0), so as to synthesize the speed/tacho-meter $P_3$ and the camera activation display image $P_9$ (S43). The component synthesizing section 116 stores, in the image component temporary memory 112, a synthesized image component of the speed/tacho-meter $P_3$ and the camera activation display image $P_9$.

Figure 20:
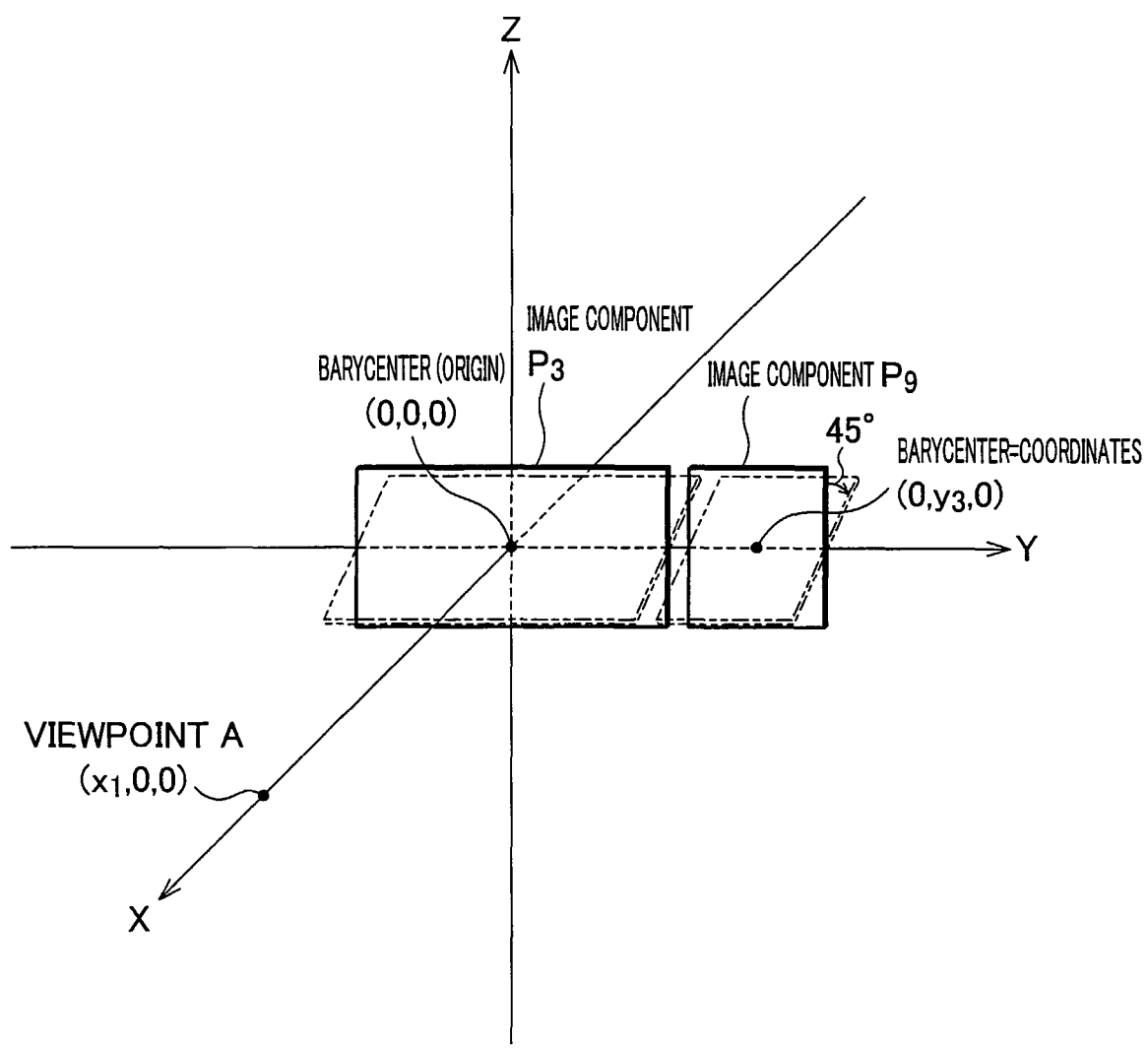
FIG. 20 illustrates two image components synthesized by a component synthesizing section shown in FIG. 19.
Figure 21:
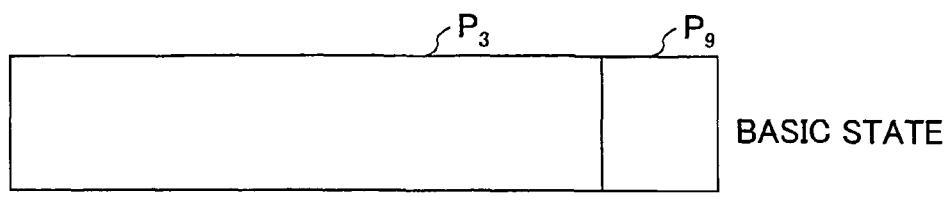
FIGS. 21(a) and 21(b) roughly show a synthesized image component.
Figure 21:
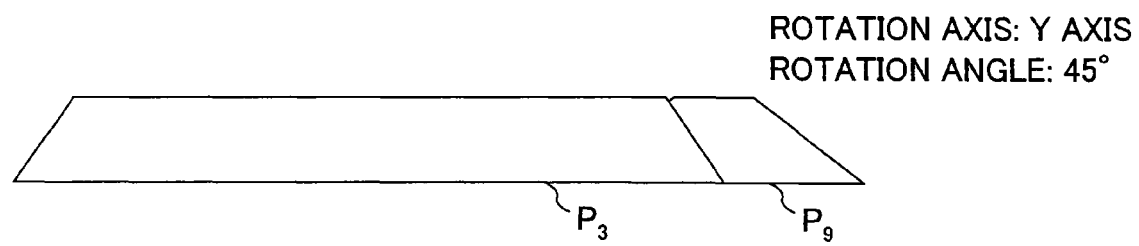

FIG. 20 shows a synthesized image component. In this figure, the speed/tacho-meter $P_3$ is simplistically shown as a rectangular plate, and the camera activation display image $P_9$ is also simplistically shown as a square plate.

The image processing section 113 then reads out the synthesized image component from the image component temporary memory 112, and determines the rotational state corresponding to the car condition "device has just been activated" and the synthesized image component, in reference to the image component display information storage section 115a. In the present case, in reference to the table shown in FIG. 22, the image processing section 113 selects "basic state" for the synthesized image component of the speed/tacho-meter $P_3$ and the camera activation display image $P_9$. As a result, the image processing section 113 generates a basic vehicle information image seen from the viewpoint A (see FIG. 20), without rotating the synthesized image component thus read out.

Subsequently, the image display processing section 114 adds display information (in this case, speed information from the speed sensor 31 and engine revolutions information from the engine revolutions sensor 32) supplied from the display information sensor system 3 and camera activation information supplied from the camera system 5, so as to display the synthesized image component on the display section 13 (S44).

On this occasion, the image display processing section 114 determines arrangement coordinates (in this case, the arrangement coordinates a0 (see FIG. 3)) corresponding to the car condition "device has just been activated" and the synthesized image component, in reference to the image component display information storage section 115a.

Figure 25:
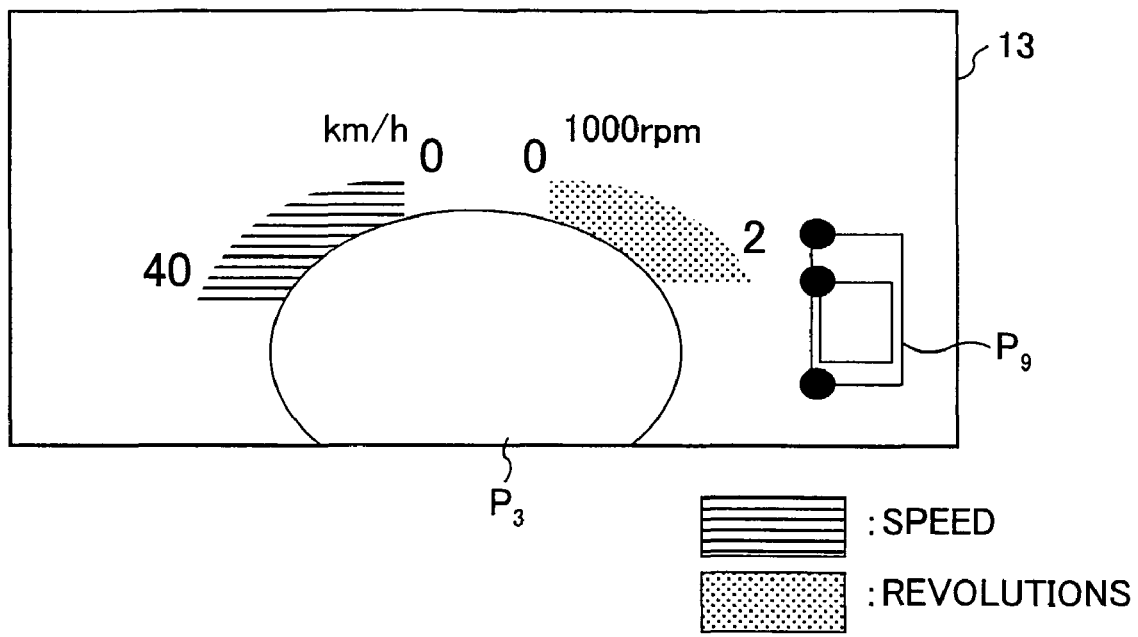
FIG. 25 illustrates an example of display on a display section of Example 4, while traveling on an ordinary road.

FIG. 25 shows an example of display on the display section 13 after the processing in S44. As shown in FIG. 25, the display section 13 displays, at the arrangement coordinates a0 (see FIG. 3), the synthesized image component of the speed/tacho-meter $P_3$ and the camera activation display image $P_9$ both in the basic state (not rotated). Note that, in FIG. 25, the camera activation display image $P_9$ indicates that cameras on the left front corner, on the left side, and on the left rear corner of the car have been activated.

Getting on a toll highway, the display control section 11a obtains, from the ETC information detection section 21, ETC information indicating that the road on which the car travels is a toll highway (S45).

In the display control section 11a having obtained the ETC information indicating that the road on which the car travels is a toll highway, the image processing section 113 selects "rotation axis: Y axis, and rotation angle: 45°" as a rotational state corresponding to the car condition "toll highway" and the synthesized image component, in reference to the image component display information storage section 115a. The image processing section 113 then generates a vehicle information image of the synthesized image component having been rotated for 45° around the Y axis (S46).

FIG. 21(a) shows a basic vehicle information image of a synthesized image component in the basic state (i.e. not rotated). FIG. 21(b) shows a vehicle information image of a synthesized image component having been rotated for 45° around the Y axis.

The image display processing section 114 then displays, on the display section 13, the vehicle information image of the synthesized image component outputted from the image processing section 113.

Subsequently, on finishing the rotation in the image processing section 113, the image component reading section 111 determines that an image component (in this case, the traveling route display image $P_{10}$) corresponding to the car condition "toll highway" should be displayed, in reference to the image component display information storage section 115a. On this occasion, the image component reading section 111 recognizes that the speed/tacho-meter $P_3$ and the camera activation display image $P_9$ have already been read out, in reference to the image component temporary memory 112. The image component reading section 111 therefore determines that the traveling route display image $P_{10}$ is the only image component to be added. The image component reading section 111 then reads out, from the image component database 12, a set of 3-D image data of the traveling route display image $P_{10}$ that is the image component to be added, so as to store this set of 3-D image data in the image component temporary memory 112.

When the traveling route display image $P_{10}$ is stored in the image component temporary memory 112, the image processing section 113 determines a rotational state (in this case, "basic state") corresponding to the car condition "toll highway" and the traveling route display image $P_{10}$, in reference to the image component display information storage section 115a (see FIG. 22). The image processing section 113 then generates a basic vehicle information image of the traveling route display image $P_{10}$ in the basic state (i.e. not rotated). Subsequently, the image display processing section 114 determines arrangement coordinates (in this case, arrangement coordinates e (see FIG. 3)) corresponding to the car condition "toll highway" and the traveling route display image $P_{10}$, in reference to the image component display information storage section 115a, so as to display the traveling route display image $P_{10}$ on the display section 13 (S47).

On this occasion, the image display processing section 114 obtains traveling route information from the navigation system 4, so as to display the traveling route display image to which the obtained information is added.

Figure 26:
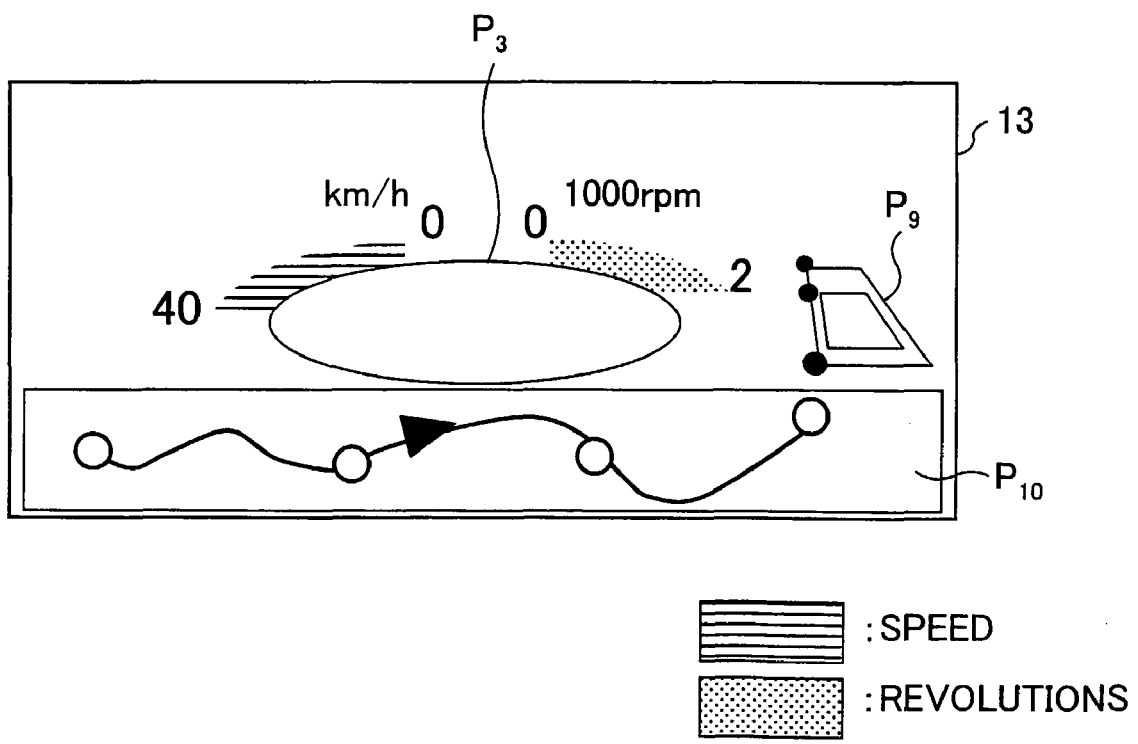
FIG. 26 illustrates an example of display on the display section of Example 4, while traveling on a highway.

FIG. 26 shows an example of display on the display section 13 after the processing in S47. As shown in this figure, the image processing section 113 rotates the synthesized image component of the speed/tacho-meter $P_3$ and the camera activation display image $P_9$, in order to narrow the vehicle information image in lengthwise. This enlarges a space for displaying an additional image, on the display section 13.

In addition to the above, the image display processing section 114 changes the arrangement coordinates of the synthesized image component from a0 to a 1 (see FIG. 3), so as to further enlarge a space below the synthesized image component.

With the above, the image display processing section 114 can display, on the display section 13, the traveling route display image $P_{10}$ that is an additional image. As a result, on the display section 13, information required while driving on a toll highway is available for the user, in addition to the meter components.

Getting off the toll highway, the display control section 11a obtains, from the ETC information detection section 21, ETC information indicating that the road on which the car travels is an ordinary road (S48).

In the display control section 11a having obtained the ETC information indicating that the road on which the car travels is an ordinary road, the image component reading section 111 and the image display processing section 114 recognize that image components corresponding to the car condition "ordinary road" do not include the traveling route display image $P_{10}$. The image component reading section 111 then deletes, from the image component temporary memory 112, the set of 3-D image data corresponding to the traveling route display image $P_{10}$. Meanwhile, the image display processing section 114 does not display the traveling route display image $P_{10}$ on the display section 13 (S49).

Subsequently, the image processing section 113 selects "basic state" as the rotational state corresponding to the car condition "ordinary road" and the synthesized image component, in reference to the image component display information storage section 115a. The image processing section 113 then rotates the synthesized image component back to the basic state, and generates a basic vehicle information image. Thereafter, the image display processing section 114 displays this basic vehicle information image on the display section 13. With this, the display section 13 performs normal display of the synthesized image component as shown in FIG. 25 (S50).

Then the power supply to the automotive display device 1 is stopped in response to an instruction from the user, so that the processing finishes.

In Embodiments 1 and 2, the image processing section 113 rotates the image component or the synthesized image component clockwise or counterclockwise, for an angle of 45° around the Y axis or Z axis. The rotation axis, however, is not necessarily the Y axis or Z axis. For instance, the rotation axis may be a line which does not pass through the origin and in parallel to the Y axis or Z axis. Moreover, the rotation axis may be an arbitrary line in parallel to neither the X axis, the Y, axis, nor the Z axis. Also, the rotation angle is not limited to 45°. The rotation angle may be optionally determined in the range of 0° to 360°. The image components can therefore be rotated in an optional direction, so that the layout of image components on the display section 13 can be variously changed.

In the embodiments above, the step of perfuming normal display of the meter components is performed after the step of activating the device. However, for instance, it is conceivable that the user takes a rest in a rest area on a highway, and then activates the device. Taking such a case into consideration, the step of obtaining ETC information may be performed after the step of reading out the meter components. The order of the steps can be suitably changed.

Examples of the vehicle driving conditions in the embodiments above are what type of road the car travels (whether an ordinary road or a highway), whether or not the engine has been started, and whether or not the car has started. However, the vehicle driving condition is not limited to these examples.

For instance, the vehicle driving condition may be a speed signal supplied from the speed sensor 31, information on whether or not the handbrake is on, or information supplied from the navigation system. In addition, the vehicle driving condition may be a traveling direction of the vehicle (i.e. to which direction the vehicle moves; going forward, going backward, turning right, or turning left). In this case, a vehicle driving condition detection section detects the traveling direction, based on the shift position (e.g. D, R, or N), information supplied from the direction indicator, or the like.

In Example 3, the determination in S27 on whether or not the car has started is detected by the start detection section 22. Instead of this, whether or not in-vehicle information is displayed may be determined based on a speed signal supplied from the speed sensor 31, the shift position (e.g. P, D, or R), or whether or not the handbrake is on.

In the examples above, the rotation is performed with respect to one predetermined axis (e.g. Y axis). Instead of this, the rotation may be performed with respect to two predetermined axes (e.g. X axis and Y axis). In this case, the rotation with respect to the Y axis may be performed after the rotation with respect to the X axis, or the rotation with respect to the X axis and the rotation with respect to the Y axis may be simultaneously performed.

In the embodiments above, an image component is rotated with a viewpoint being fixed. Instead of this, a viewpoint may be rotated with respect to an image component, with the image component being fixed. This is because relative positions of the viewpoint and the image component do not change in either case. Whether to fix the viewpoint or the image component can be easily switched by a processing program in the image processing section 113. Note that, in a case where the viewpoint is changed, the image component information storage section 115 stores image components and viewpoints in association with one another.

In Embodiments 1 and 2, the image processing section 113 rotates image components, in accordance with sets of vehicle driving condition information supplied from the ETC information detection section 21, the start detection section 22, and the device activation detection section 14. This allows the automotive display device to automatically perform display suitable for a driving condition. On this account, the user is not required to perform any special operations.

However, an image required by the user may not be displayed in some cases. For instance, the user may want to see the in-vehicle temperature display image $P_8$ while driving on a highway. In such a case, the following arrangement may be adopted: in response to an instruction inputted by the user using an operation section (not illustrated), the image processing section 113 rotates an image component (e.g. speed meter) so as to create a blank space on the display section 13, and the image display processing section 114 displays, on the blank space, an image component required by the user. With this, the user can see both the speed meter and the in-vehicle temperature display image.

The image processing section 113 may create a blank space on the display section 13, by rotating a currently-displayed image component (e.g. speed meter) in response to an instruction from either the camera system 5 or the navigation system 4. Then the image display processing section 114 may display, on the blank space, an image taken by the camera system 5 or map information supplied from the navigation system 4. This allows the user to simultaneously see (i) the speed meter and (ii) the image taken by the camera system 5 or the map information supplied from the navigation system 4.

When the shift position is at "P" (parking), an image component (e.g. speed meter) may be rotated for 90° in any direction with respect to any axis, so as to cause the speed meter not to be displayed. In this case, the speed meter is not necessarily displayed because the vehicle is parked. On this account, it is possible to display a large image (e.g. a navigation image, camera image, and a TV image) on the region where the speed meter was displayed. Thereafter, when the condition of the vehicle changes from the parking state to the ready-to-start state as the shift position is changed from "P" to another one, it is possible to display the speed meter by rotating the speed meter for 90° in a reverse direction with respect to the aforesaid axis.

The invention being thus described, it will be obvious that the same may be varied in many ways within the scope of the claims below. An embodiment made up of technical means disclosed in different embodiments is not to be regarded as a departure from the spirit and scope of the invention.

The sections and processing steps of the automotive display devices 1 and 1a of the aforesaid embodiments can be realized in such a manner that computing means such as a CPU executes a program stored in storage means such as ROM (Read Only Memory) and RAM, so as to control input means such as a keyboard, output means such as a display, communication means such as an interface circuit, or the like. On this account, the functions and processes of the automotive display devices of the aforesaid embodiments can be realized by causing a computer including the aforesaid means to read out the program from a storage medium and execute the program. Furthermore, a removable storage medium storing the aforesaid program allows for realization of the aforesaid functions and processes on any computer.

Such a computer program storage medium may be a memory (not shown), such as a ROM, so that the process is executable on a microcomputer. Alternatively, a program medium may be used which can be read by inserting the storage medium in an external storage device (program reader device; not shown).

In addition, in either of the cases, it is preferable if the contained program is accessible to a microprocessor which will execute the program. Further, it is preferable if the program is read, and the program is then downloaded to a program storage area of a microcomputer where the program is executed. Assume that the program for download is stored in a main body device in advance.

In addition, the program medium is a storage medium arranged so that it can be separated from the main body. Examples of such a program medium include a tape, such as a magnetic tape and a cassette tape; a magnetic disk, such as a flexible disk and a hard disk; a disc, such as a CD/MO/MD/DVD; a card, such as an IC card (inclusive of a memory card); and a semiconductor memory, such as a mask ROM, an EPROM (erasable programmable read only memory), an EEPROM (electrically erasable programmable read only memory), or a flash ROM. All these storage media hold a program in a fixed manner.

Alternatively, if a system can be constructed which can connects to the Internet or other communications network, it is preferable if the program medium is a storage medium carrying the program in a flowing manner as in the downloading of a program over the communications network.

Further, when the program is downloaded over a communications network in this manner, it is preferable if the program for download is stored in a main body device in advance or installed from another storage medium.

In the embodiments above, the rotation of a vehicle information image is performed by an image generating section. Instead of this, for instance, the following arrangement may be adopted: a first vehicle information image (basic image) and plural types of second vehicle information images are stored in advance in storage means such as a memory, and selecting means selects one of these vehicle information images, in accordance with a driving condition of the vehicle and an instruction from the user.

The embodiments and examples described in Detailed Description of Preferred Embodiments are for illustrative purposes only and by no means limit the scope of the present invention. Variations are not to be regarded as a departure from the spirit and scope of the invention, and all such modifications as would be obvious to one skilled in the art are intended to be included within the scope of the claims below.

The automotive display device of the present invention can improve visibility of vehicle information images, and hence suitable for, for instance, in-vehicle use.

The invention claimed is:

1. An automotive display device which is provided in vehicle and includes a display section arranged to display a vehicle information image including information in regard to the vehicle, the display vehicle information image being generated based on at least one first vehicle information image, the automotive display device comprising:
   an image generating section arranged to generate a second vehicle information image by, when necessary, rotating said at least one first vehicle information for a predetermined angle around a predetermined rotation axis, the display section being arranged to display additional information along with the second vehicle information image, the additional information being information that was not previously shown together with the at least one first vehicle information image;
   an image display processing section that displays the second vehicle information image on the display section; and
   a vehicle driving condition detection section that is arranged to detect a driving condition of the vehicle; wherein
   the image generating section is arranged to rotate said at least one first vehicle information image to generate said second vehicle information image in accordance with a determination of a type of road on which the vehicle travels that is performed by a vehicle driving condition information portion, the type of road being detected by the vehicle driving condition detection section; and
   the additional information is contained in an additional information area and is generated in the display section by rotating and shrinking the at least one first vehicle information image.

2. A display method in an automotive display device which is provided in a vehicle and includes a display section arranged to display a vehicle information image including information in regard to the vehicle, the display vehicle information image being generated based on at least one first vehicle information image, the display method comprising the steps of:

detecting a driving condition of a vehicle;

generating a second vehicle information image by, when necessary, rotating the at least one first vehicle information image for a predetermined angle around a predetermined rotation axis, in accordance with the driving condition of the vehicle which is detected via the step of detecting a driving condition of a vehicle, the display section displaying additional information along with the second vehicle information image, the additional information being information that was not previously shown together with the at least one first vehicle information image; and displaying the second vehicle information image on the display section; wherein said at least one first vehicle information image is rotated via the step of generating a second vehicle information image in accordance with a determination of a type of road on which the vehicle travels that is performed by a vehicle driving condition information portion, the type of road being detected through the step of detecting a driving condition of the vehicle; and the additional information is contained in an additional information area and is generated in the display section by rotating and shrinking the at least one first vehicle information image.

\* \* \* \* \*